(12) United States Patent
Lu et al.

(10) Patent No.: US 8,935,560 B2
(45) Date of Patent: Jan. 13, 2015

(54) SYSTEM AND METHOD OF FILE LOCKING IN A NETWORK FILE SYSTEM FEDERATED NAMESPACE

(75) Inventors: Fengcheng Lu, Santa Clara, CA (US); Kang Wei, Beijing (CN); Uresh Vahalia, Newton, MA (US); Jean-Pierre B. Bono, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 566 days.

(21) Appl. No.: 12/943,042

(22) Filed: Nov. 10, 2010

(65) Prior Publication Data
US 2012/0072763 A1    Mar. 22, 2012

(30) Foreign Application Priority Data
Sep. 17, 2010   (CN) .......................... 2010 1 0255371

(51) Int. Cl.
*G06F 11/00*   (2006.01)
*G06F 21/62*   (2013.01)
*G06F 17/30*   (2006.01)

(52) U.S. Cl.
CPC ...... *G06F 21/6218* (2013.01); *G06F 17/30171* (2013.01); *G06F 17/30203* (2013.01); *G06F 2221/2147* (2013.01)
USPC .......................................................... 714/2

(58) Field of Classification Search
CPC ............ G06F 11/0793; G06F 11/1469; G06F 11/0745; G06F 11/1471
USPC ......................................... 714/2, 15; 707/704
See application file for complete search history.

(56) References Cited

U.S. PATENT DOCUMENTS

| 6,336,171 B1 * | 1/2002 | Coskrey, IV ................... 711/152 |
| 2008/0147942 A1 * | 6/2008 | Brown et al. .................. 710/200 |
| 2010/0114889 A1 * | 5/2010 | Rabii et al. .................... 707/737 |

OTHER PUBLICATIONS

Dictionary definition of SAN (Storage Area Network), retrieved on May 19, 2014 from http://en.wikipedia.org/wiki/Storage_area_network.*
Dictionary definition of SAN (Network Attached Storage), retrieved on May 19, 2014 from http://en.wikipedia.org/wiki/Network-attached_storage.*

* cited by examiner

*Primary Examiner* — Yair Leibovich
(74) *Attorney, Agent, or Firm* — Deepika Bhayana; Krishnendu Gupta

(57) ABSTRACT

A method, system and apparatus of a file locking within a network file system federated namespace is disclosed. In one embodiment, a method includes accessing a target file in a storage medium over a network through an intermediate proxy server using a processor. The storage medium may be any one storage medium of a group of storage mediums on the network forming a data sharing cluster. In addition, the method includes locking the target file in the storage medium through a lock protocol to enable an access to modify the target file to at most one user at any given time, via the intermediate proxy server.

22 Claims, 16 Drawing Sheets

SYSTEM AND METHOD OF FILE LOCKING IN A NETWORK FILE SYSTEM FEDERATED NAMESPACE

CLAIM OF PRIORITY

This application claims priority from China application number 201010255371.6 filed on Sep. 17, 2010.

FIELD OF TECHNOLOGY

This disclosure relates generally to a technical field of storage devices and, in one embodiment, to a system and method of file locking within a network file system federated namespace.

BACKGROUND

A file lock protocol may enable a client device to lock a file on a storage server in a data network. For example, a network file system may provide a file locking ability through a network lock manager protocol. Locking a file may prevent a data corruption and/or data inconsistency. However, a modification of the data network structure and/or architecture may result in the file lock protocol being inoperable in the modified environment.

SUMMARY

A method, system and apparatus of file locking within a network file system federated namespace are disclosed.

In one aspect, a method includes accessing a target file in a storage medium over a network through an intermediate proxy server using a processor. The storage medium may be any one storage medium of a group of storage mediums on the network forming a data sharing cluster. In addition, the method includes locking the target file in the storage medium through a lock protocol to enable an access to modify the target file to at most one user at any given time, via the intermediate proxy server.

In another aspect, a method of an intermediate proxy server includes forwarding a lock protocol message and/or a status notify message from the client device to the storage medium using a processor, and from the storage medium to the client device using the processor. The method of the intermediate proxy server also includes storing a forwarding context in the intermediate proxy server. In addition, the method of the intermediate proxy server includes maintaining a link identifier to improve a robustness of the locking operation of the target file through a crash recovery handling operation.

In yet another aspect, a system includes a client device, a plurality of storage mediums forming a data sharing cluster, a storage medium of the plurality of storage mediums to comprise a target file and an intermediate proxy server. The intermediate proxy server is coupled between the client device and the storage medium over a network through a transmission medium. The intermediate proxy server of the file locking system is configured to forward a lock protocol message and/or a status notify message from the client device to the storage medium, and from the storage medium to the client device. In addition, the intermediate proxy server is configured to create a forwarding context that includes a client device address, and/or client device port number to identify the client device to which the lock protocol message from the storage medium is addressed. The intermediate proxy server is also configured to append a lock identifier and the forwarding context to the lock message protocol when forwarding a lock protocol message from the client device to the storage medium. The lock identifier is configured to identify a pair of the client device and the intermediate proxy server through which the lock protocol message from the client device is forwarded to the storage medium. The intermediate proxy server is also configured to store the forwarding context in the intermediate proxy server. In addition, the intermediate proxy server is configured to maintain a link identifier to improve a robustness of the locking operation of the target file through a crash recovery handling operation.

BRIEF DESCRIPTION OF THE DRAWINGS

Example embodiments are illustrated by way of example and not limitation in the figures of the accompanying drawings, in which like references indicate similar elements and in which:

The embodiment of FIG. 1 illustrates a system view of a distributed lock mechanism in a network file system federated namespace environment based on a network lock manager (NLM)/status monitor (SM).

Figure 2:
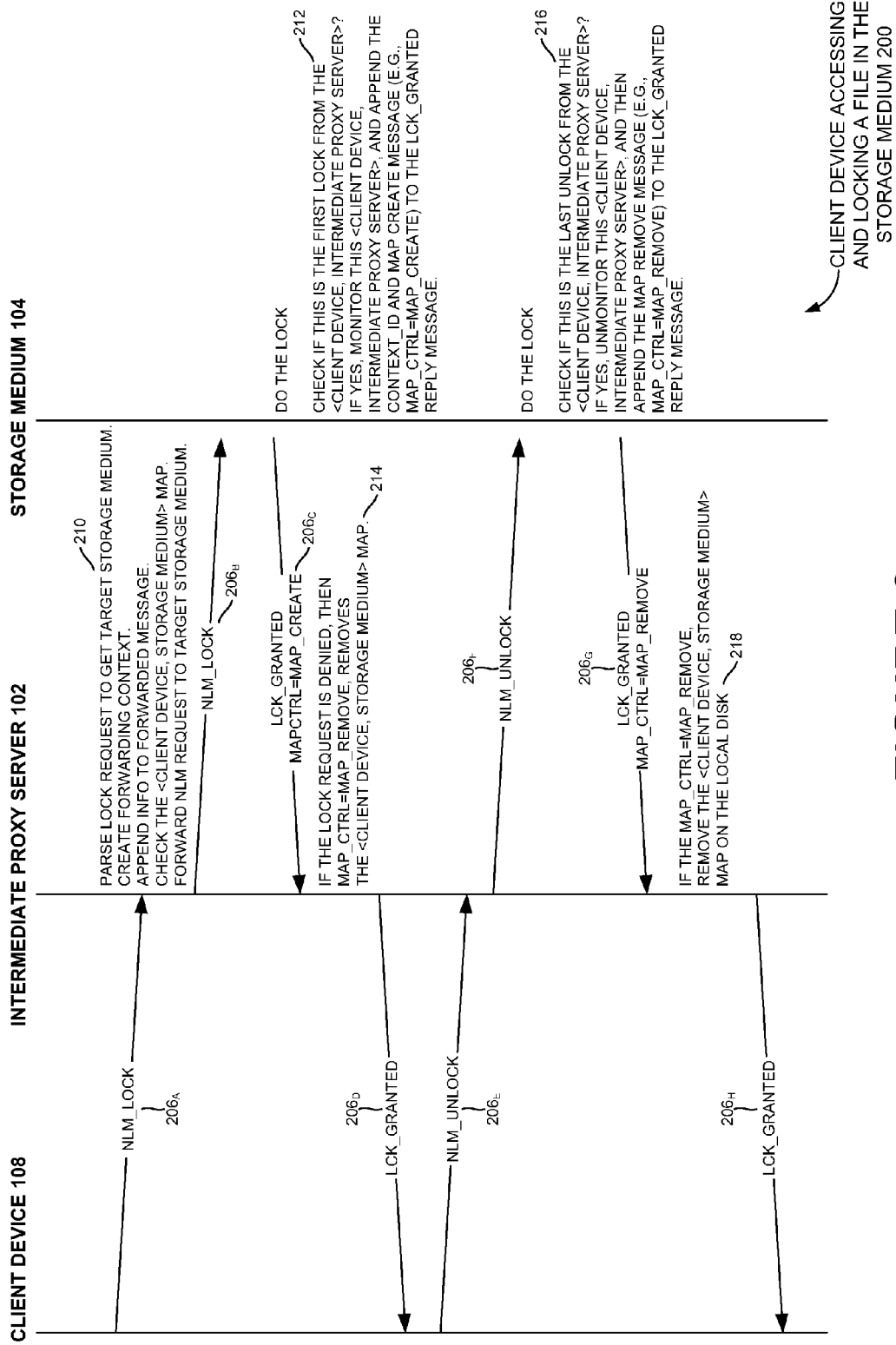

The embodiment of FIG. 2 illustrates a remote procedure call diagram of a client device accessing and locking a target file in the storage medium.

Figure 3:
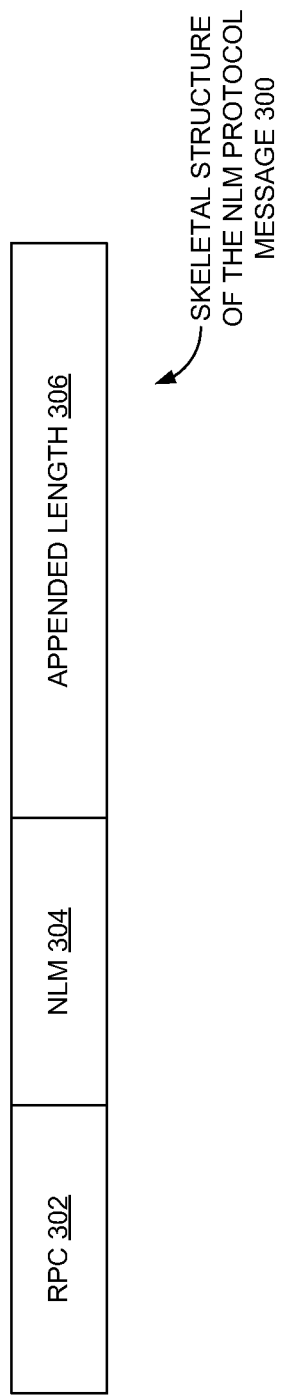

The embodiment of FIG. 3 illustrates a packet view of a lock protocol message in a network file system federated namespace environment.

Figure 4:
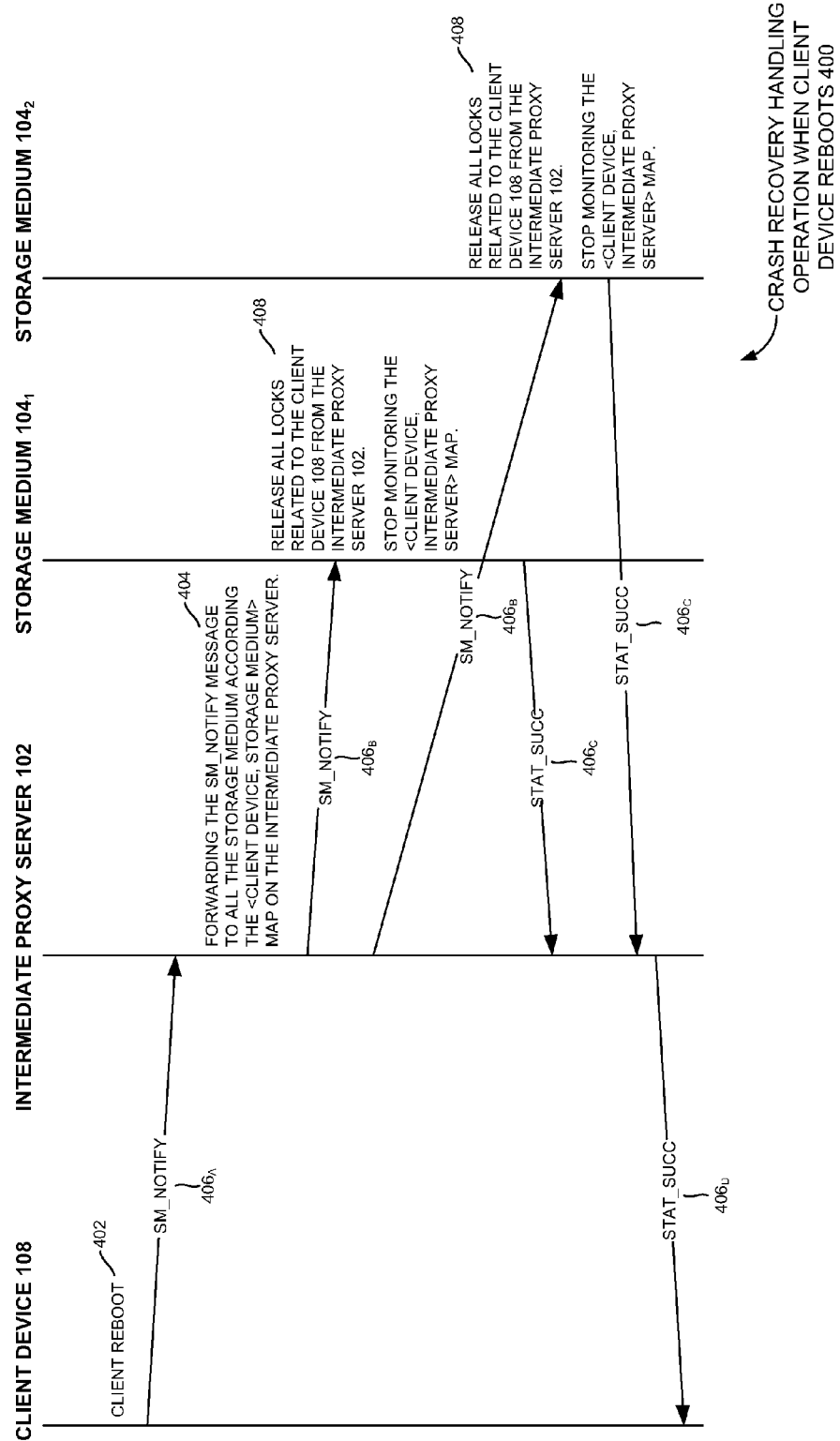

The embodiment of FIG. 4 illustrates a remote procedure call diagram of a crash recovery handling operation when the client device restarts.

Figure 5:
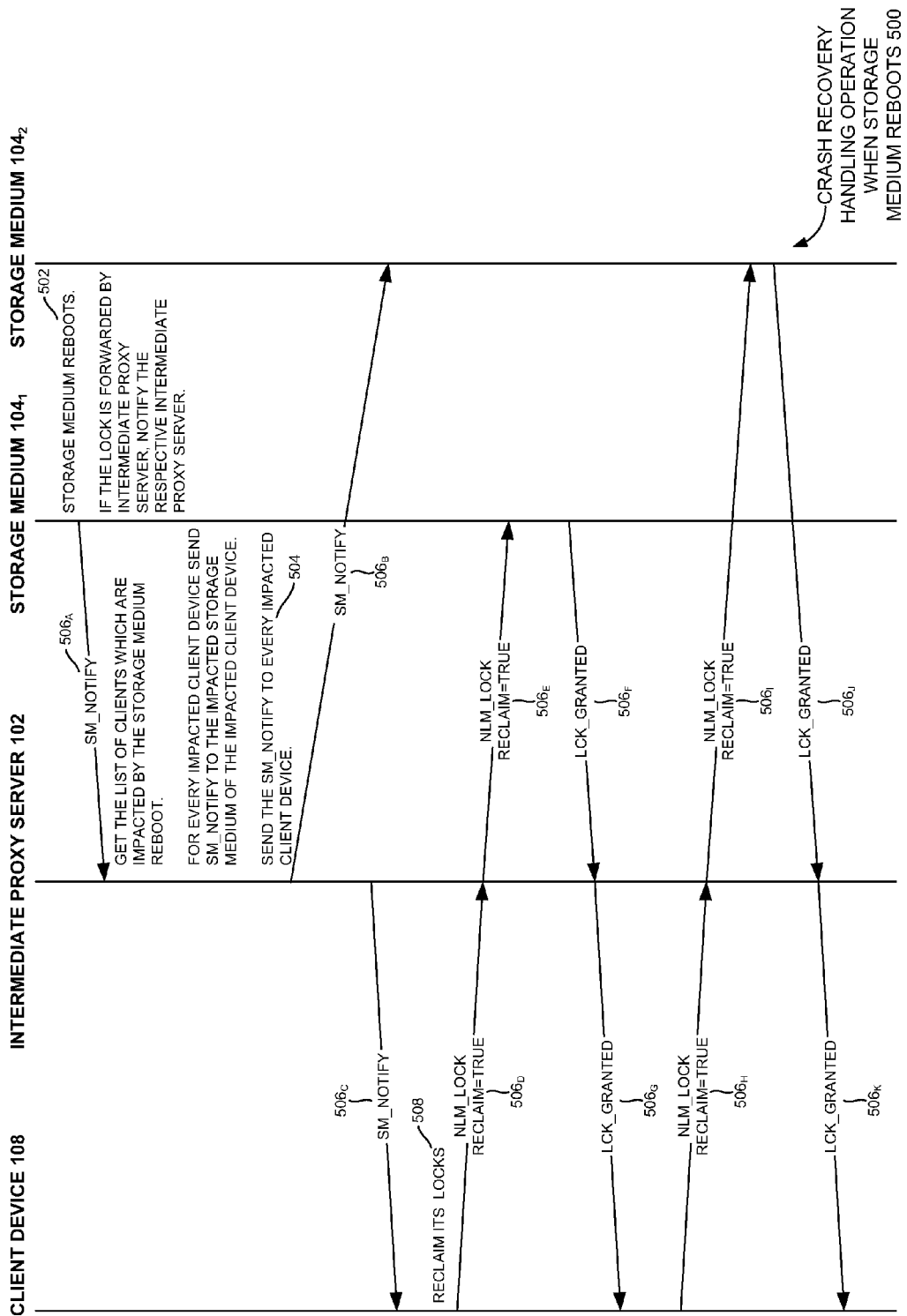

The embodiment of FIG. 5 illustrates a remote procedure call diagram of a crash recovery handling operation when the storage medium restarts.

Figure 6:
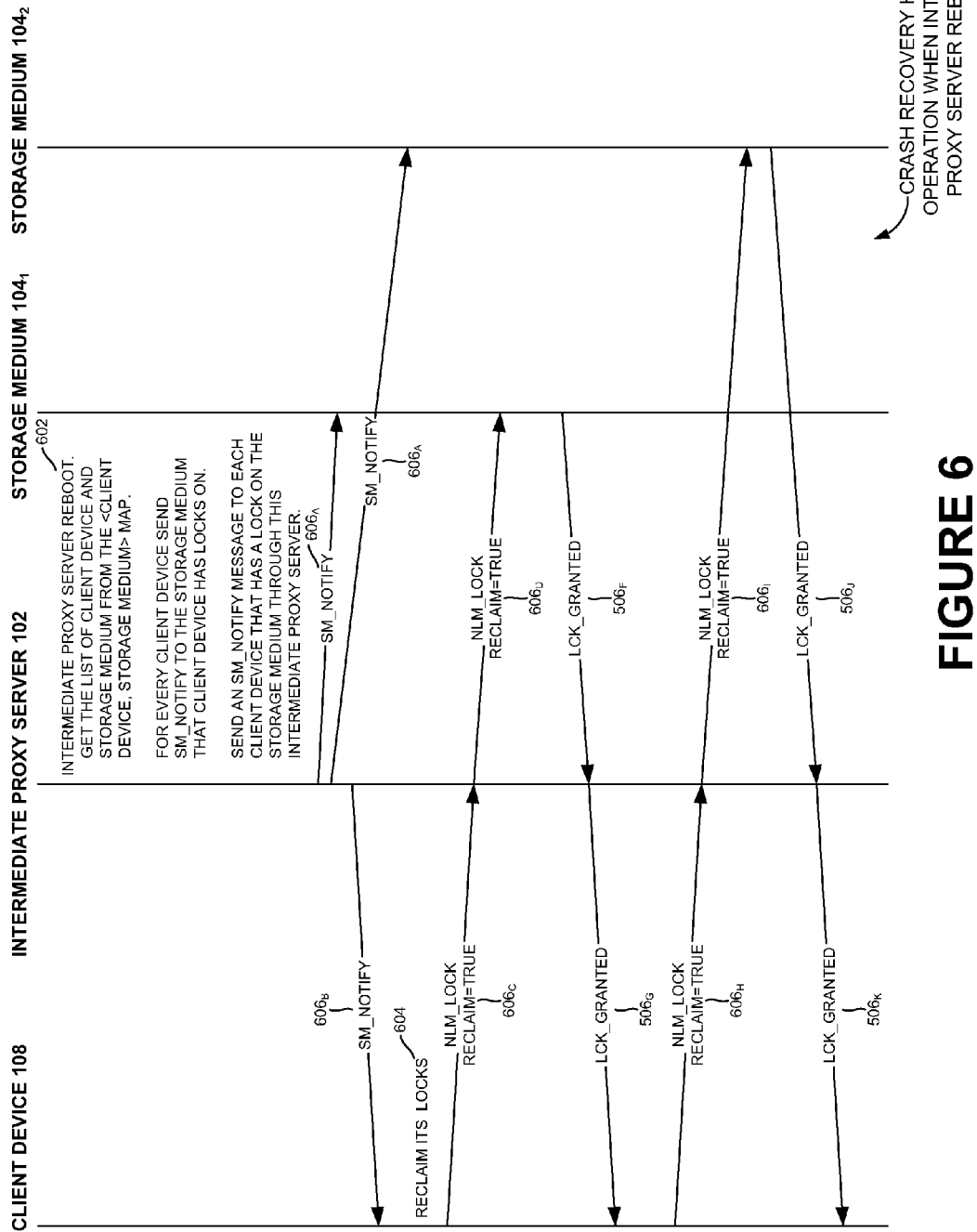

The embodiment of FIG. 6 illustrates a remote procedure call diagram of a crash recovery handling operation when the intermediate proxy server restarts.

Figure 7:
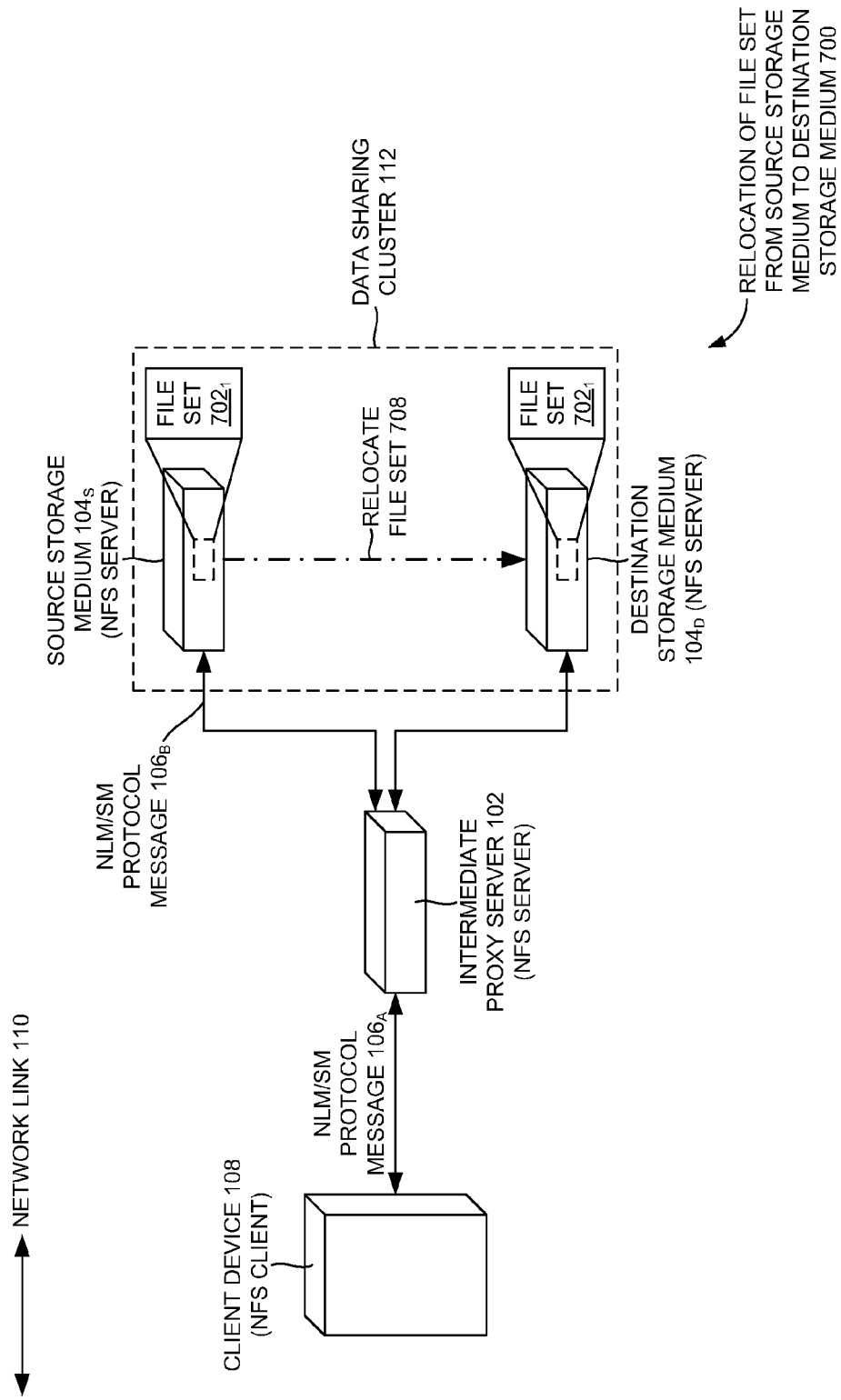

The embodiment of FIG. 7 illustrates a system view of a relocation of a file set from a source storage medium to a destination storage medium in the network file system federated namespace environment.

Figure 8:
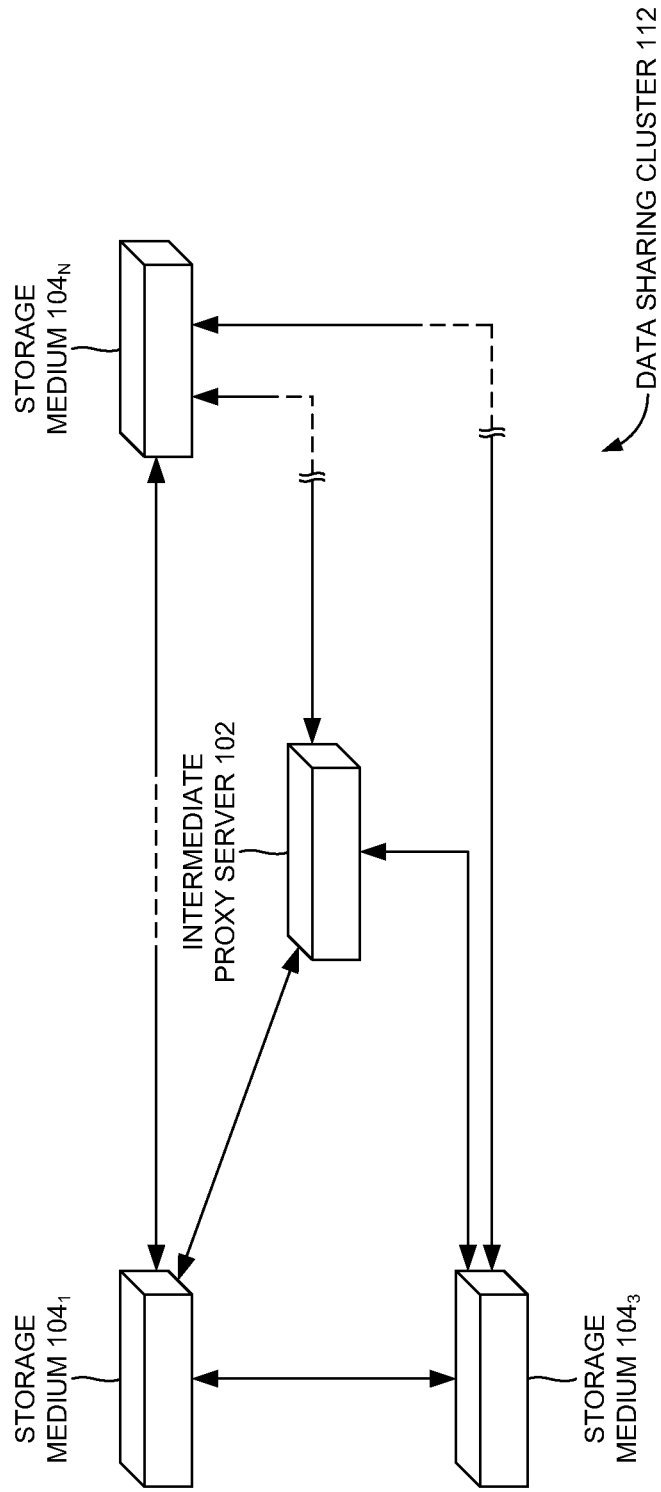

The embodiment of FIG. 8 illustrates a network view of a mesh network connecting the storage mediums of the group of storage mediums on a network forming a data sharing cluster.

Figure 9:
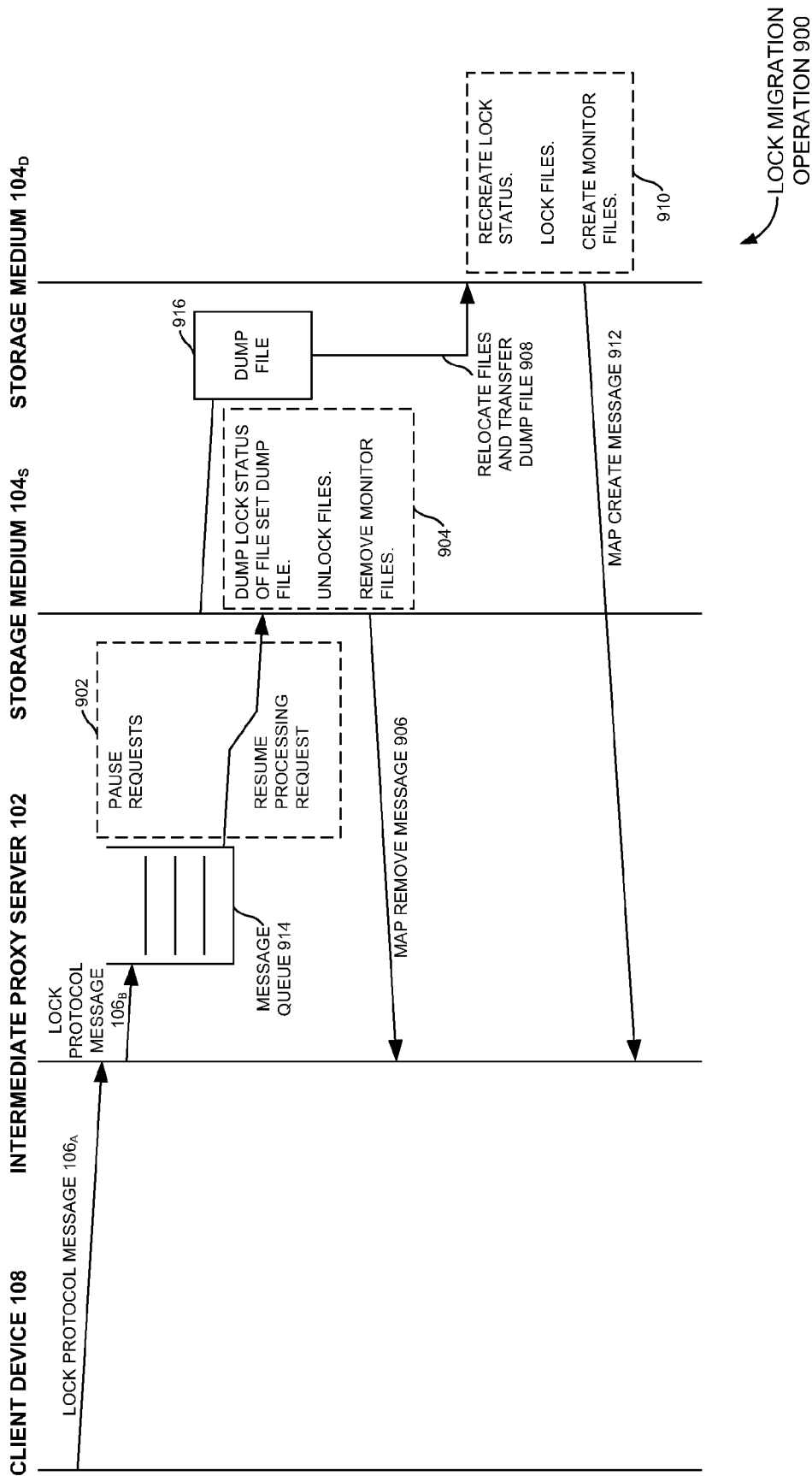

The embodiment of FIG. 9 illustrates a remote procedure call diagram of a lock migration operation in a network file system federated namespace environment.

Figure 10:
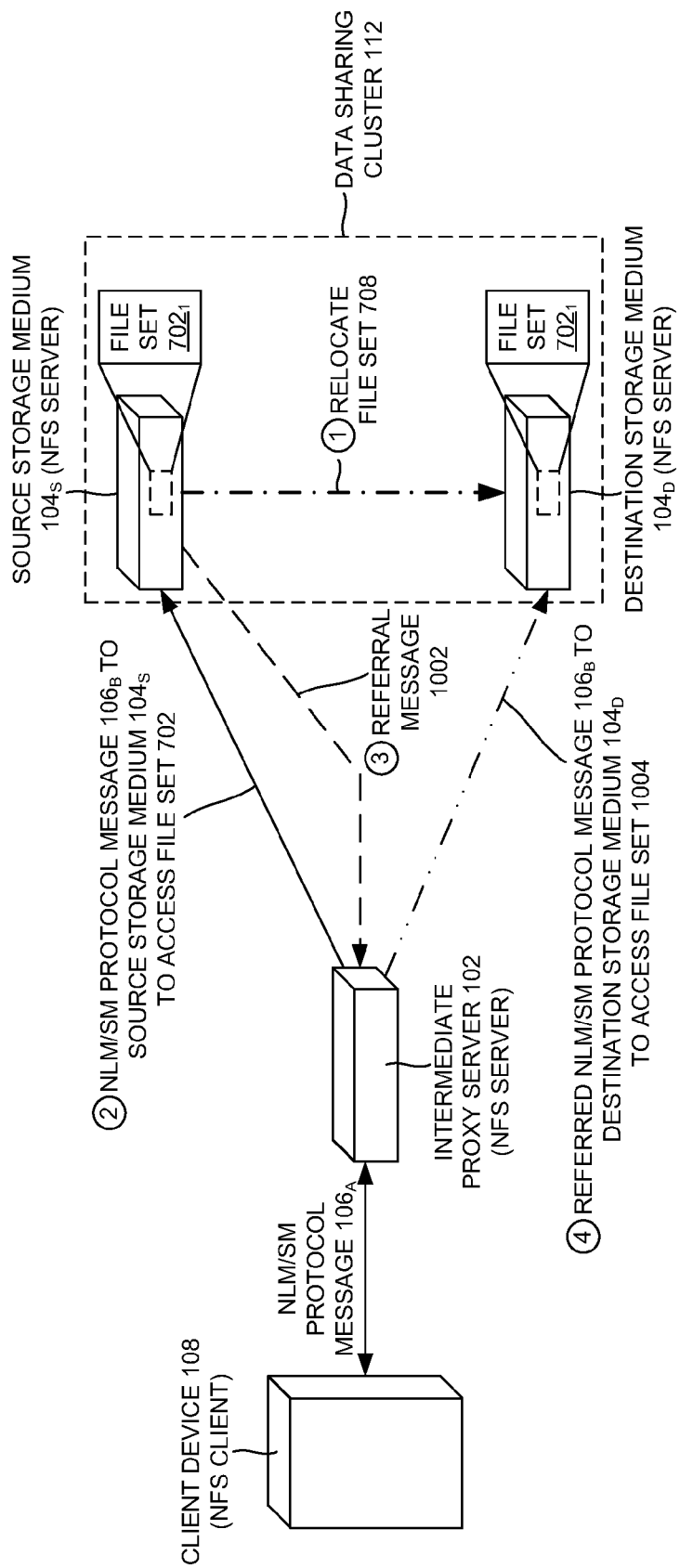

The embodiment of FIG. 10 illustrates a network view of a referral procedure of a lock migration operation in a network file system federated namespace environment.

Figure 11:
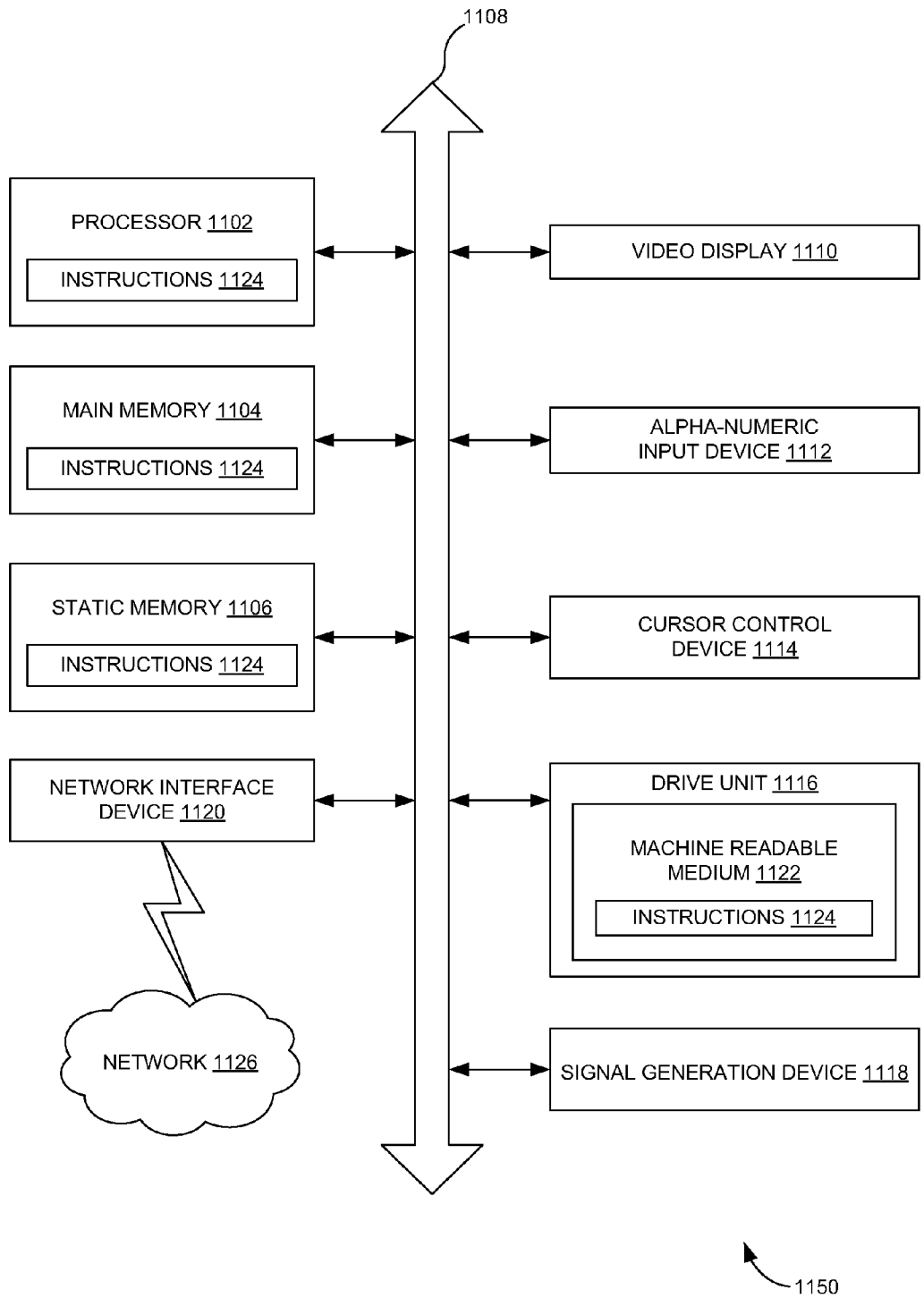

The embodiment of FIG. 11 illustrates a system view of a data processing system in which any of the embodiments disclosed herein may be performed, t.

Figure 12:
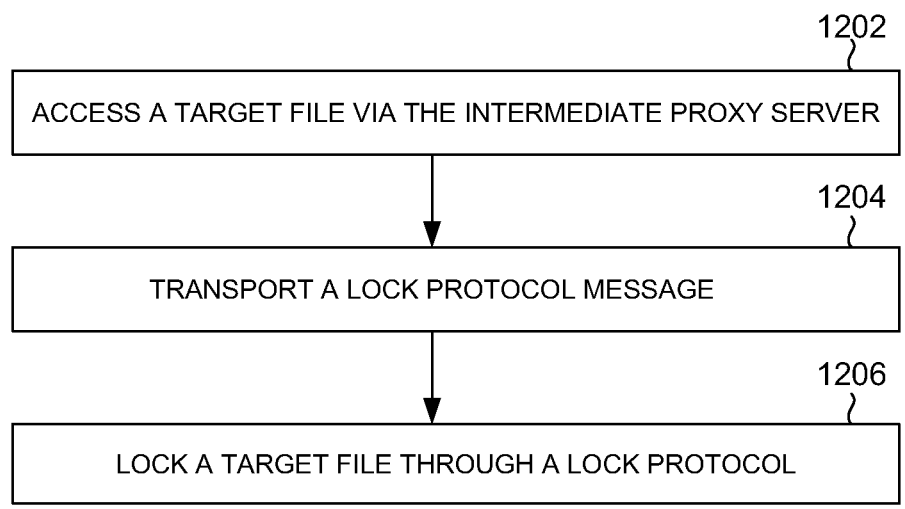

The embodiment of FIG. 12 illustrates a process flow diagram illustrating a locking mechanism.

Figure 13A:
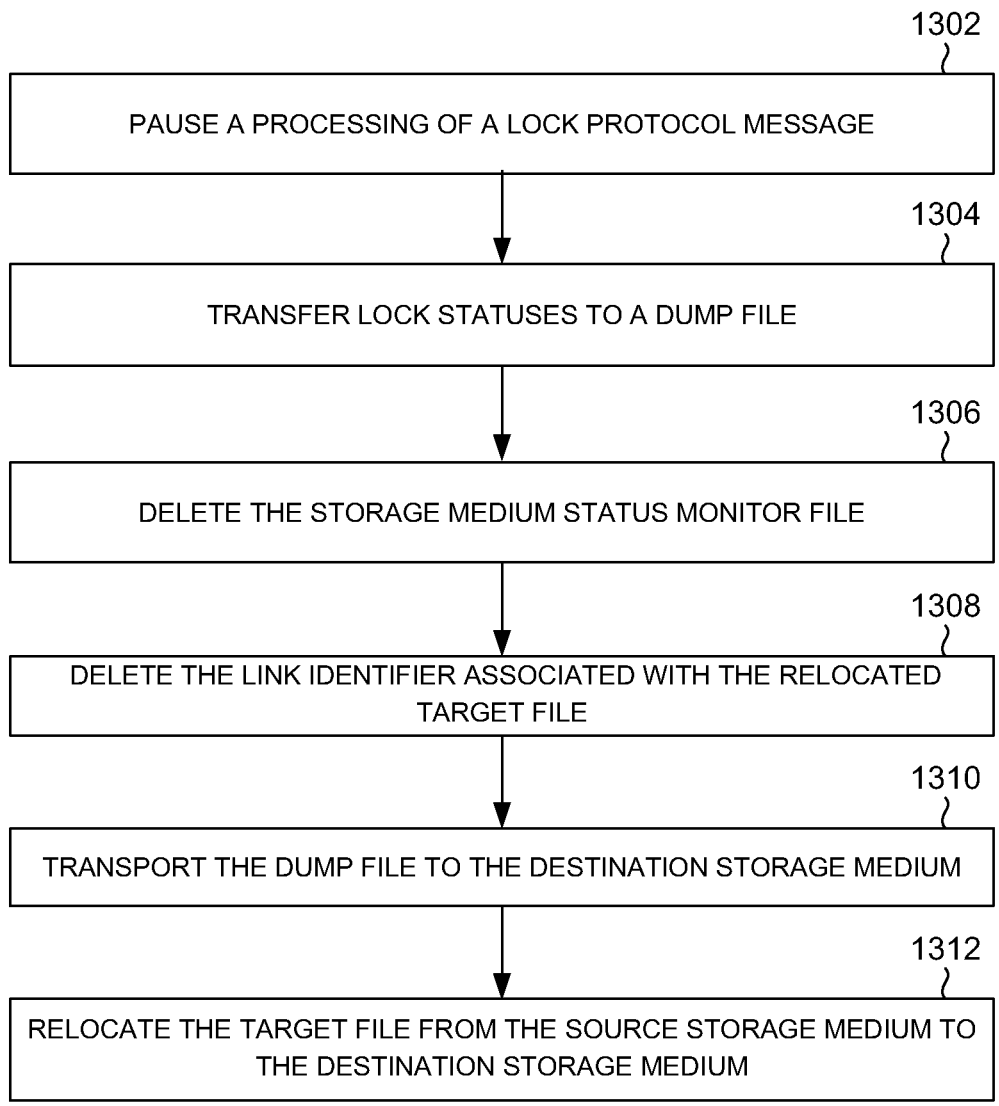

The embodiment of FIG. 13A illustrates a process flow diagram illustrating a lock migration mechanism described herein.

Figure 13B:
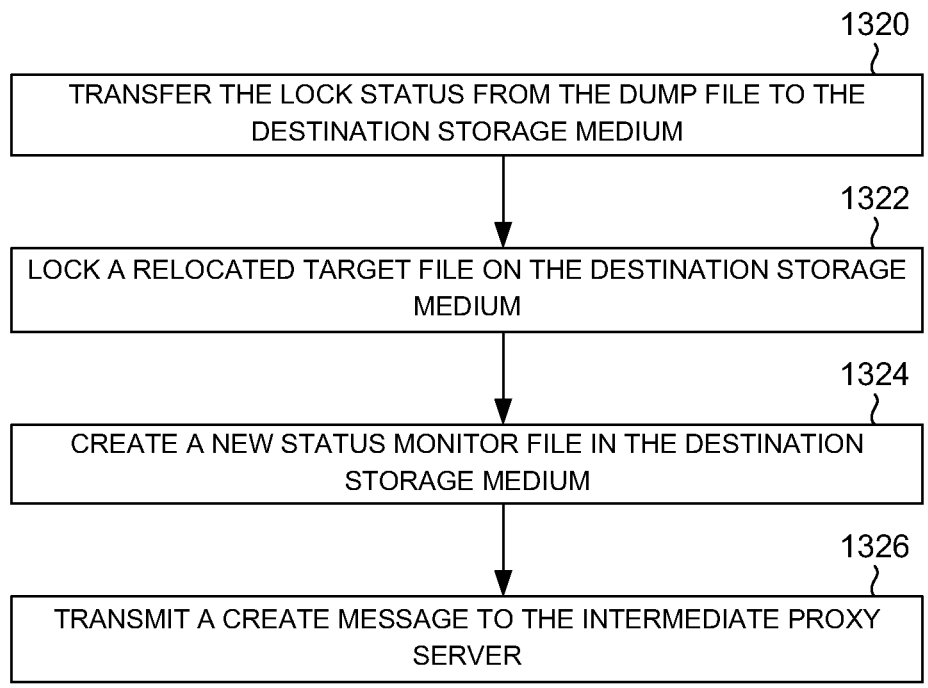

The embodiment of FIG. 13B illustrates a continuation of FIG. 13A illustrating operations involved after the migration of the target file.

Figure 14:
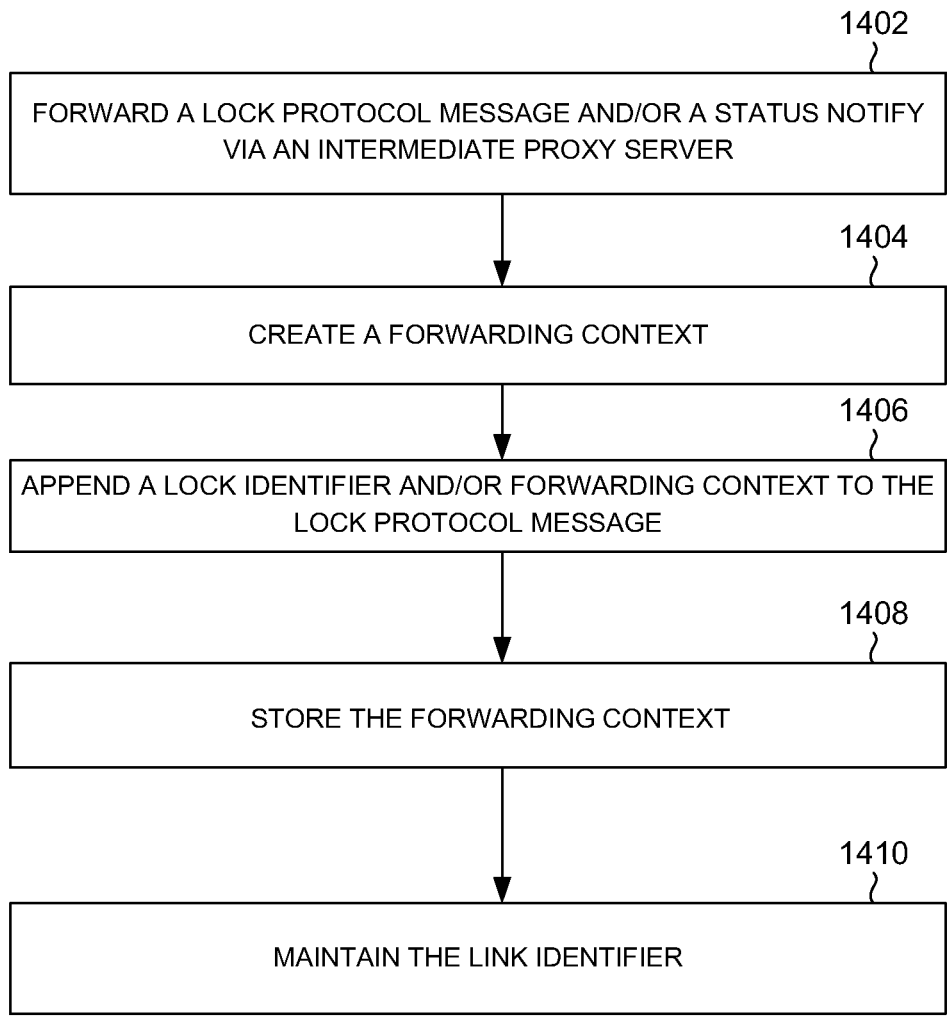

The embodiment of FIG. 14 illustrates process flow diagram illustrating an operation of the intermediate proxy server.

Figure 15:
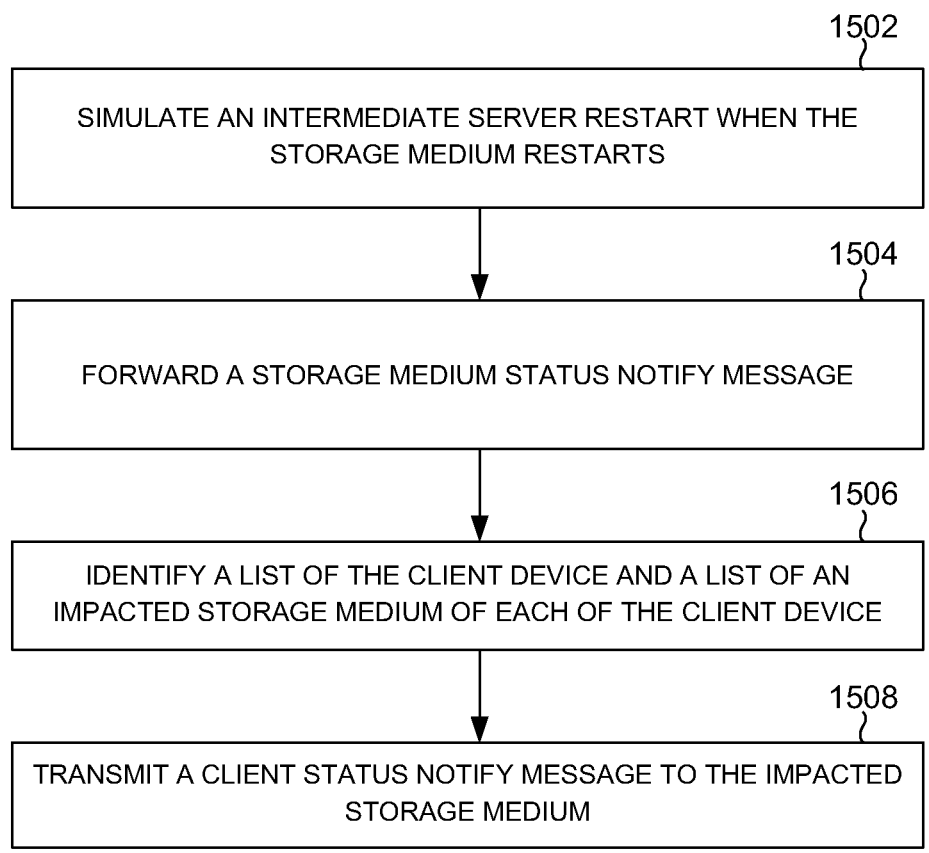

The embodiment of FIG. 15 illustrates a process flow diagram illustrating crash recovery handling operation performed through the intermediate proxy server when the storage medium restarts.

Other features of the present embodiments will be apparent from the accompanying drawings and from the detailed description that follows.

DETAILED DESCRIPTION

A method, system and apparatus of file locking within a network file system federated namespace are disclosed. Although the present embodiments have been described with reference to specific example embodiments, it will be evident that various modifications and changes may be made to these embodiments without departing from the broader spirit and scope of the various embodiments. The methods, systems, and apparatuses disclosed herein may be implemented in any means for achieving various aspects. Other features will be apparent from the accompanying drawings and from the detailed description that follows.

A Network File System (NFS) federated namespace may be a logical namespace generated from two or more server aggregations configured to use a unified set of interfaces and protocols to provide file services to the client device through the NFS protocol. In another example embodiment, the NFS federated namespace may be a realization of a NAS data sharing cluster spread across a two or more data servers. In an example embodiment, the data servers may be storage servers on a data network. In one or more embodiments, the data servers may be an NFS server. In one or more embodiments, the data sharing cluster may be a network attached storage (NAS) data sharing cluster. The group of data servers forming the data sharing cluster may be configured to operate as a network attached storage. In one or more embodiments, the data servers may be aggregated to form the network attached storage.

A data storage network may include one or more client device, and one or more storage mediums communicatively coupled to the one or more server device through the network. In one or more embodiments, a data cluster may be formed by aggregating the server devices. In one or more embodiments, the data sharing cluster may be a group of server devices configured to share storage mediums, and to share data on aforementioned storage mediums. In one or more embodiments, the server devices in the data sharing cluster may be storage server devices.

In one or more embodiments, a data sharing cluster may include two or more nodes. In some embodiments, a host operating system may be installed in each of the node in the data sharing cluster. In certain embodiments, each node may include one or more data server devices. In at least some embodiments, each of the server devices may be configured as a NFS server device configured to provide services to the client device. In further embodiments, the service to the client device may be a file service. The NFS server device as described herein may be configured as a storage medium (herein used as 'a storage medium').

In one or more embodiments, a NFS protocol may be used for enabling file services in the data storage network. In one or more embodiments, the NFS protocol may be a network protocol configured to enable one or more client devices to access files from the one or more storage mediums configured as in the data sharing cluster as though the one or more storage mediums are locally coupled (e.g., Network-Attached storage) to the client device. In one or more embodiments, the storage mediums (e.g., NFS server devices) may be configured to "export" special directories and files to client device.

In some embodiments, on a client device side, the directory exported by the storage mediums may be "mounted" (e.g., using a mount protocol) to access to the storage mediums in the data sharing cluster. In one or more embodiments, the NFS protocol provides a file handle structure termed as a filehandle or a NFS filehandle to the server device to enable the client device to uniquely identify exported special directories and files to which an operation is to be performed. In one or more embodiments, the operations may include but is not limited to a new file storage operation, read operation, and write operation.

In one or more embodiments, the operations on the files in the storage medium may be performed by multiple client devices. In certain embodiments, to protect a file from being operated by multiple client devices, a locking mechanism termed as "file locking" may be provided to restrict access to a file by allowing a single client device or a process to process the file at any specific time.

In one or more embodiments, the NFS protocol may be stateless and so a Network Lock Manager (NLM) protocol may be used to support locking of NFS-mounted files. In one or more embodiments, the NLM protocol may allow an application of the client device to lock or unlock a region of a file defined by an offset and a length. In other words, the lock can span an entire file, or starting with an offset of zero and with a defined length.

In one or more embodiments, there may be two types of lock provided by the NLM protocol: a shared lock and an exclusive lock. In one or more embodiments, a shared lock enables applications including the application that applied a lock to the file to perform read operation on the data in the region of the file specified by the shared lock. In one or more embodiments, two or more client devices can hold shared locks on the same region of a file or overlapping regions in the file. In one or more embodiments, an exclusive lock prevents applications other than the application that applied lock from performing a read operation and/or write operation on a data in the region of the file specified by the exclusive lock. In a further embodiment, in case of the exclusive lock, two or more client devices are not allowed to establish any other lock on a region of the file in the storage medium that is defined by the exclusive lock.

In some embodiments, a Status Monitoring (SM) protocol may be used in the NFS file systems to support the NFS protocol. In one or more embodiments, the NLM protocol and the SM protocol is based on a Remote Procedure Call (RPC) procedures. In the embodiment having a federated namespace environment, the communication between the one or more client devices and the one or more storage mediums may be enabled through an intermediate proxy server. In one or more embodiments, the intermediate proxy server may be configured to as a proxy between the storage mediums of the data storage cluster and the one or more clients communicating NLM and SM protocol messages. In one or more embodiments, the intermediate proxy server may be configured to represent the one or more storage mediums in a federated namespace environment.

In one or more embodiments, any of NLM requests from the one or more client devices may be communicated to the intermediate proxy server. In one or more embodiments, in the federated namespace environment, the one or more client devices are configured to be aware of the intermediate proxy server. In some embodiments, the NLM requests communicated to the intermediate proxy server may be forwarded to the storage medium in the data sharing cluster. In certain embodiments, the storage medium owning a target file may be configured to process the NLM request. In one or more embodiments, each of the devices in the data sharing network may be configured to communicate with other devices in the network to which the device is enabled to communicate with. In a particular embodiment, the storage mediums are configured to communicate with each other in the data sharing cluster. In one or more embodiments, each of the storage mediums in the data sharing cluster are configured to communicate with each of the intermediate proxy server associated with the data sharing cluster. In further embodiments, each of the client devices may be configured to communicate with the intermediate proxy server 102 that the client devices are associated with. In one or more embodiments, each of the devices in the data sharing network may be configured to receive an acknowledge message as a reply to a message communicated to the other device. In a certain embodiment, if an acknowledge message is not received as a reply then the particular device which communicated the message may be configured to retransmit the message.

Figure 1:
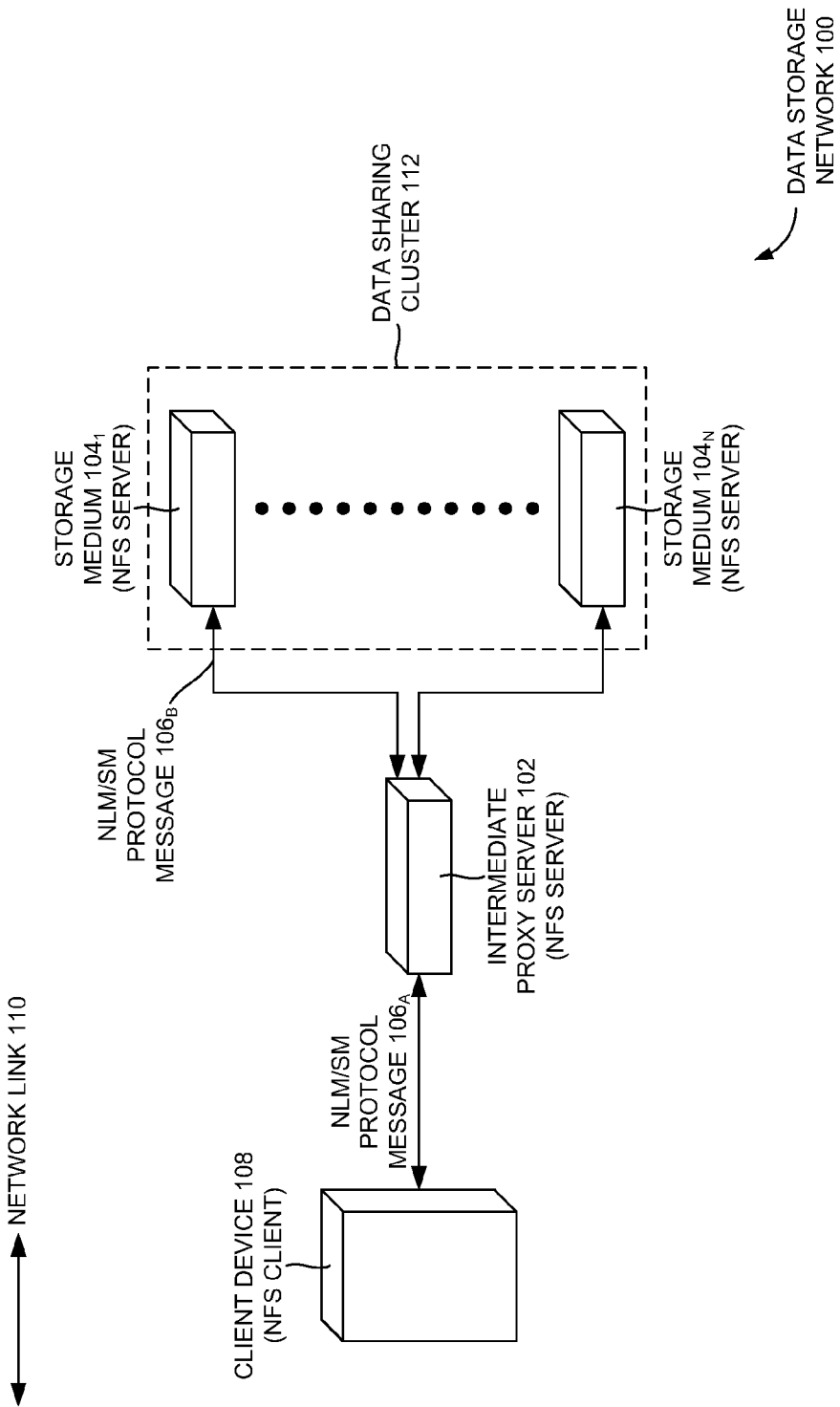

FIG. 1 illustrates an exemplary embodiment of file level communication between a client device and the one or more server devices in a federated namespace environment.

Referring to the embodiment of FIG. 1 each of a client device 108, an intermediate proxy server 102 and one or more storage mediums $104_{1-N}$ are configured to maintain a status monitor file. In one or more embodiments, any file based event associated with the client device 108, intermediate proxy server 102 and/or server medium 104 may be recorded in the status monitor file of the device. In one or more embodiments, the status monitor file may be generated in each of the devices in the data storage network through an SM protocol daemon. In the embodiment of FIG. 1, the SM protocol daemon in the client device 108, the intermediate proxy server 102 and the storage medium 104 may generate the status monitor file in the client device 108, the intermediate proxy server 102 and the storage medium 104 respectively. In this embodiment, the SM protocol daemon may be a process handling the status monitoring and generating SM_NOTIFY messages. In one or more embodiments, the status monitor file in each of the devices may be used in crash recovery operation when any of the devices in the data storage network reboots.

In one or more embodiments, such as the embodiment of FIG. 1, the NLM protocol may be configured to use the SM protocol to provide a timely notification of loss of lock state of any of the client device 108, the intermediate proxy server 102 and/or one or more storage mediums $104_{1-N}$ to any of the client device 108, the intermediate proxy server 102 and/or one or more storage mediums $104_{1-N}$ in the data storage network. In one or more embodiments, a SM protocol may provide a service that notifies the devices in the data storage network about loss of lock state of the of federated namespace environment. In one or more embodiments, such as the embodiment of FIG. 1, the one or more storage mediums and the client device 108 may obtain SM notifications when any of the devices in the data storage network is rebooted. In one or more embodiments, such as the embodiment of FIG. 1, each of the storage mediums in the data sharing cluster 112 may be configured to maintain a record of lock on a target file owned by the storage medium.

In one or more embodiments, such as the embodiment of FIG. 1, a mesh network may be maintained between the storage mediums $104_{1-N}$ in the federated namespace. In some embodiments, such as the embodiment of FIG. 1, the mesh network may include the storage mediums $104_{1-N}$ and/or the intermediate proxy servers 102. In alternative embodiments, there may be more than one intermediate proxy servers. In some embodiments, the intermediate proxy servers may be coupled to each other and/or the storage mediums through a mesh network. In the embodiment of FIG. 1, each of the storage mediums $104_{1-N}$ may be configured to sense (e.g., listen) the NLM messages and receive the NLM message from any other storage mediums $104_{1-N}$ in the Federated Namespace through a specific device port provided thereof. In one or more embodiments, the specific device port may be associated with the dedicated network. In one or more embodiments, the forwarded NLM messages may be communicated (e.g., transported) through the dedicated tunnel to enable the storage mediums $104_{1-N}$ to distinguish the forwarded messages from the client device 108.

The embodiment of FIG. 1 illustrates a system view of a distributed lock mechanism in a NFS federated namespace based on a network lock manager (NLM)/status monitor (SM). In one or more embodiments, the NFS protocol may be an NFS version 2 protocol and/or an NFS version 3 protocol. In one or more embodiments, a NFS federated namespace may be a logical namespace generated from two or more server aggregations configured to use a unified set of interfaces and protocols to provide file services to the client device through the NFS protocol. In an example embodiment, such as that of FIG. 1, the federated namespace may be a realization of a NAS data sharing cluster spread across a group of storage mediums $104_{1-N}$. In an example embodiment, such as illustrated in the example embodiment of FIG. 1, the intermediate proxy server 102 may be used as an interface to communicate NLM/SM protocol messages $106_{A-B}$ between the client device 108 and the storage medium $104_{1-N}$. In one or more embodiments, such as the embodiment of FIG. 1, the intermediate proxy server 102 may be configured to operate as a proxy of one or more of the storage mediums forming the network attached storage data sharing cluster 112. In one or more embodiments, such as the embodiment of FIG. 1, the intermediate proxy server 102 may be configured to operate as a proxy of the network attached storage data sharing cluster 112. In one or more embodiments, such as the embodiment of FIG. 1, the storage medium $104_{1-N}$ may initiate a communication to the client device 108. In the example embodiment of FIG. 1, a data storage network 100 may include an intermediate proxy server 102, one or more storage mediums $104_{1-N}$, Network Lock Manager (NLM)/Status Monitor (SM) protocol messages $106_{A-B}$, a client device 108, a network link 110 and a data sharing cluster 112.

In the embodiment of FIG. 1, the client device 108, the intermediate proxy server 102 and the one or more storage mediums $104_{1-N}$ may be communicatively coupled through the network link in a network. In one or more embodiments, the network link may be a wired medium or a wireless medium through which a request and responses are configured to be communicated. In one or more embodiments, such as the embodiment of FIG. 1, the intermediate proxy server 102 may be a server device configured to accept requests from client devices to communicate to the one or more storage mediums $104_{1-N}$ and to communicate responses from the one or more storage mediums $104_{1-N}$ to the client device 108. In one or more embodiments, such as the embodiment of FIG. 1, the requests made by the client device 108 to the storage mediums $104_{1-N}$ may be for file services. In one or more embodiments, such as the embodiment of FIG. 1, the intermediate proxy server 102 may be proxy server. A proxy server may be a transparent or opaque entity that performs whole or part of a server function at a location near or away from the actual server. In one or more embodiments, such as the embodiment of FIG. 1, the client device 108 communicates all requests to access the storage medium $104_{1-N}$ to the intermediate proxy server 102. In an example embodiment, such as the embodiment of FIG. 1, the client device 108 may access any shared file in the network attached storage data sharing cluster 112 through accessing any one of the storage mediums configured to form the network attached storage data sharing cluster 112. In an example embodiment, such as the embodiment of FIG. 1, the client device 108 may access any shared file in the network attached storage data sharing cluster 112 through accessing the intermediate proxy server 102. In the embodiment of FIG. 1, the intermediate proxy server 102 may also be configured to operate as a storage medium. In one or more embodiments, such as the embodiment of FIG. 1, the NFS federated namespace system may have one or more intermediate proxy servers. In the embodiment of FIG. 1, the client device may access the target file on the storage medium through one or more intermediate proxy servers. In one or more embodiments, such as the embodiment of FIG. 1, NFS protocol may be implemented in the data sharing cluster 112 for file services. In one or more embodiments, such as the embodiment of FIG. 1, the NLM protocol may be implemented for supporting file locking in the NFS environment.

In one or more embodiments, such as the embodiment of FIG. 1, the NLM/SM protocol messages $106_{A-B}$ may include, but not limited to an NLM_LOCK message, an NLM_TEST message, an NLM_UNLOCK message, an NLM_CANCEL message, an NLM_GRANTED message, a LCK_BLOCKED message, a LCK_GRANTED message and/or LCK_DENIED message. In an example embodiment, such as the embodiment of FIG. 1, the NLM/SM protocol messages $106_{A-B}$ may be a remote procedure call made by the client device 108, the storage mediums $104_{1-N}$ and/or the intermediate proxy server 102. In one or more embodiments, such as the embodiment of FIG. 1, the NLM/SM protocol message $106_A$ may be the NLM protocol message transmitted between the client device 108 and the intermediate proxy server 102. In one or more embodiments, such as the embodiment of FIG. 1, the NLM/SM protocol message $106_B$ may be the lock protocol message transmitted between the intermediate proxy server 102 and the storage mediums $104_{1-N}$. In an example embodiment, such as the embodiment of FIG. 1, the above mentioned NLM/SM protocol messages $106_{A-B}$ may be communicated between the client device 108 and the storage medium 104 through the intermediate proxy server 102 to handle operations related to accessing and/or locking a target file in the storage medium 104 in which the target file may be stored. In one example embodiment, such as the embodiment of FIG. 1, the client device 108 may communicate a lock request message (e.g., NLM_LOCK) to perform lock operation (e.g., exclusive lock) on a portion of a target file in one of the storage medium 104, for example, the storage medium $104_1$. In an example embodiment, such as the embodiment of FIG. 1, the client device 108 may also lock an entire target file on the storage medium 104. In another example embodiment, such as the embodiment of FIG. 1, an application on the client device 108 may request to lock a target file on the storage medium 104 through the intermediate proxy server 102.

In an example embodiment, such as the embodiment of FIG. 1, the NLM_LOCK procedure call from a client device 108 may create a locked byte range on a file in the storage medium 104. In the embodiment of FIG. 1, the storage medium 104 may return a LCK_GRANTED message if the lock is granted. In one or more embodiments, such as the embodiment of FIG. 1, once the lock is granted the client device 108 may be one of the clients that may hold a lock on the target file. In some embodiments, such as the embodiment of FIG. 1, the NLM_LOCK request may not be granted if a conflicting lock exists. In certain embodiments, the lock may not be granted if the lock held on the target file is an exclusive lock. In the embodiment of FIG. 1, if the client device 108 sets a block flag in the NLM_LOCK request to true, the storage medium 104 may return a LCK_BLOCKED message, which may indicate that the client device 108 should expect an asynchronous NLM_GRANTED message when the existing lock on the target file is removed and the lock is granted to the client that sent the NLM_LOCK request. In the embodiment of FIG. 1 the block flag may indicate that the client expects the storage medium 104 to hold a block on target file on the storage medium until the lock may be granted. In one or more embodiments, if the block flag is set to false, the storage medium will return a LCK_DENIED message.

In one or more embodiments, such as the embodiment of FIG. 1, the NLM_GRANTED message may be an asynchronous lock protocol message. In one or more embodiments, such as the embodiment of FIG. 1, the NLM_LOCK may be a synchronous lock protocol message. In one or more embodiments, when a synchronous lock protocol message is initiated by any device on the data network, the device waits for the procedure to complete and obtain a response to the procedure call or a response to the synchronous lock protocol message before initiating a new procedure call. However, in at least some embodiments, when a device on the data storage network initiates an asynchronous lock protocol message the device does not wait for the procedure to complete and obtain a response to the procedure call before issuing a new procedure call or lock protocol message.

In one or more embodiments, such as the embodiment of FIG. 1, the NLM_TEST procedure call may check the availability to lock a target file on the storage medium 104. In some embodiments, the NLM_CANCEL procedure call may cancel a blocked NLM_LOCK request. In the embodiment of FIG. 1, the NLM_UNLOCK procedure call may unlock a locked region of the target file on the storage medium 104.

In an example embodiment, such as the embodiment of FIG. 1, the storage mediums $104_{1-N}$ may be an NFS server. In another example embodiment of FIG. 1, the storage mediums $104_{1-N}$ may be a storage server on a data network. In one or more embodiments, such as the embodiment of FIG. 1, the data sharing cluster 112 may be a network attached storage data sharing cluster. In one or more embodiments, such as the embodiment of FIG. 1, the group of storage mediums $104_{1-N}$ forming the data sharing cluster 112 may be configured to operate as a network attached storage. In some embodiments, the storage mediums may be a storage server. In one or more embodiments, the storage servers may be aggregated to form the network attached storage.

In one or more embodiments, such as the embodiment of FIG. 1, the client device 108 may communicate a lock protocol message (e.g., NLM/SM protocol message $106_A$) to the storage medium $104_1$. In the embodiment of FIG. 1, the intermediate proxy server 102 coupled in between the client device and the storage mediums $104_{1-N}$ may receive the NLM/SM protocol message $106_A$. In the embodiment of FIG. 1, the intermediate proxy server 102 may then forward the NLM/SM protocol message $106_B$ to the storage medium $104_1$. In FIG. 1, the intermediate proxy server 102 may append additional data to the NLM/SM protocol message $106_A$ and transmit it to the storage medium $104_1$. In the embodiment of FIG. 1, the storage medium $104_1$ may evaluate a NLM request (e.g., lock request) from the client device 108 through the intermediate proxy server 102 to see whether any lock on the target file exists. In some embodiments, if there is a conflicting lock (e.g., another exclusive lock) that exists on the portion of the file or the whole file when the NLM request is made, then the NLM_LOCK request may not be granted. In the embodiment of FIG. 1, the storage medium $104_1$ generates and communicates a LCK_BLOCKED message to the client device 108 through the intermediate proxy server 102 if the block flag is set in the NLM_LOCK message. In some embodiments, the LCK_BLOCKED message may indicate that there is a conflicting lock on the target file and the client device can expect asynchronous NLM_GRANTED callback when the lock is granted. In the embodiment of FIG. 1, if the lock is not granted, then the storage medium $104_1$ may return a LCK_DENIED message, indicating that the lock is not granted. The lock mechanism as described above may be between the client device 108 and the storage medium $104_1$, and may be applied to a data storage network that includes two or more client device 108 and two or more storage mediums. An example of the file locking mechanism given in the embodiment of FIG. 2.

Refer now to the embodiments of FIG. 1 and FIG. 2. The embodiment of FIG. 2 illustrates a remote procedure call diagram of a client device accessing and locking a target file in the storage medium. The components as described in the embodiment of FIG. 1 are used herein in reference to FIG. 2 for explanatory purposes. In one or more embodiments, there may be several RPC procedures calls that are used for file locking/unlocking. In the embodiment of FIG. 2, a subset of the RPC procedure calls are used for explanation. In this embodiment, the explanation for file locking/unlocking herein is based on NLM protocol. In other embodiments, the file locking/unlocking as described herein may be performed using other protocols as well.

In the embodiment of FIG. 2, in operation $206_A$, the client device 108 initiates an NLM_LOCK procedure call to lock a target file on the storage medium 104. In this embodiment, the client device may send the NLM_LOCK message to the intermediate proxy server 102. In this embodiment, the intermediate proxy server 102 may receive the NLM_LOCK message from the client device 108 to lock a target file. In some embodiments, an information related to the intermediate proxy server 102 to which the client device communicates to lock a target file on the storage medium 104 may be stored in a status monitor file on the client device 108. In the embodiment of FIG. 2, upon receiving the NLM_LOCK request message, an operation 210 may be initiated in the intermediate proxy server 102. In this embodiment, operation 210 may include parsing the NLM_LOCK request sent from the client device 108 to identify the storage medium 104 where the target file in stored. In addition, the operation 210 may include creating a forwarding context and/or a lock identifier that may include information about the intermediate proxy server 102. In this embodiment, the intermediate proxy server 102 may append the forwarding context and/or the lock identifier to the NLM_LOCK message transmitted from the intermediate proxy server 102 to the storage mediums $104_{1-N}$. In one or more embodiments, the forwarding context and/or the lock identifier may be a data.

In some embodiments, the forwarding context data may include a client device address, a client device port number, a RPC_ID, and a flag if the NLM procedure is asynchronous. In certain embodiments, the forwarding context stored in the intermediate proxy server may enable the intermediate proxy server to identify the client device to which the lock protocol message from the storage medium is addressed.

In one or more embodiments, such as the embodiment of FIG. 2, the lock identifier data may include information about the client device 108 and the intermediate proxy server 102 through which the lock would be applied on the file of the storage medium 104. In the embodiment of FIG. 2, the intermediate proxy server 102 may store the client device 108 information and the information of the storage medium 104 on which the client device 108 hold a lock in a status monitor file on the intermediate proxy server 102. In this embodiment, a link identifier may identify the map between client device 108 and the storage medium 104 on which the client 108 holds a lock. In this embodiment, the map may associate the client device 108 to the storage medium 104 on which the respective client device 108 hold a lock. In the embodiment of FIG. 2, the status monitor file on the intermediate proxy server 102 may monitor the client device 108 to the storage medium 104 on which the respective client device 108 hold a lock. In this embodiment, when the client device's 108 lock on the storage medium 104 is removed, the status monitor file may be updated to remove the respective client device 108 and storage medium 104 from the status monitor file.

In the embodiment of FIG. 2, the client device 108 may communicate the NLM_LOCK request to the storage medium 104, in operation $206_B$. In this embodiment, the storage medium 104 may receive the NLM_LOCK message from the intermediate proxy server 102 and an operation 212 is initiated. In the embodiment of FIG. 2, the storage medium 104 may lock a portion of the target file on the storage medium 104, in operation 212. In this embodiment, the client device 108 may modify the target file once it has a lock on the target file. In some embodiments, a LCK_GRANTED message may be generated, in operation 212. In certain embodiments, if there is a lock already existing on the file, a LCK_BLOCKED or a LCK_DENIED messages may be generated. In the embodiment of FIG. 2, a record of the lock (e.g., lock status) on the target file in the storage medium 104 may be maintained in a storage medium table in the operation 212. In one or more embodiments, the lock status may be maintained by the storage medium on which the locked target file exists. In some embodiments, if the lock on the storage medium is the first lock that the client has on the storage medium, then an information related to the client device 108 that requests the lock on the storage medium 104 and the information relation to the intermediate proxy server 102 through which the client device 108 communicates with the storage medium 104 may be stored in a status monitor file of the storage medium 104. In certain embodiments, the status monitor file in the storage medium 104 may include a list of the client devices that hold a lock on the target files in the storage medium 104 and the intermediate proxy servers through which the client devices obtain a lock on the storage medium 104. In one or more embodiments, the storage medium status monitor file may monitor a lock status of a pair of client device 108 and the intermediate proxy server 102 through which the client device 108 locks the target file on the storage medium 104. In one or more embodiments, such as the embodiment of FIG. 2, the lock identifier may identify a client device 108 and intermediate proxy server 102 pair that is associated with the lock in the storage medium 104.

Furthermore, in the operation 212, a context_ID and/or a create message may be appended to the reply message may be generated (e.g., LCK_GRANTED) in the embodiment of FIG. 2. The create message may be illustrated as map_ctrl=map_create message in the embodiment of FIG. 2. In one or more embodiments, the context_ID may be generated from the forwarding context appended to the NLM_LOCK message from the intermediate proxy server 102 to the storage medium 104.

In the embodiment of FIG. 2, after successful application of a lock on the target file, a lock identifier may be generated. In some embodiments, an appropriate reply message may be communicated by the storage medium 104 to the intermediate proxy server 102 (e.g., LCK_GRANTED with map_ctrl message). In the embodiment of FIG. 2, upon reception of the message by the intermediate proxy server 102 from the storage medium 104, an operation 214 is initiated. In the embodiment of FIG. 2, the LCK_GRANTED reply message may be forwarded to the client device 108, in operation 214 by updating the status monitor file with the status information (e.g., response obtained from the storage medium) in the intermediate proxy server 102.

In the embodiment of FIG. 2, if there are more intermediate proxy servers communicatively coupled to the client device 108 and the storage medium 104, a request to lock a target file on the storage medium may be communicated through multiple intermediate proxy servers. In some embodiments, the lock request on a target file from same client but different intermediate proxy server may be treated by the storage medium 104 as though the lock requests are from different client devices. In certain embodiments, the storage medium 104 may treat all requests for applying a lock on a same target file by a same client device through different intermediate proxy server as a different lock requests on the file. In the embodiment of FIG. 2, the lock identifier enables the storage medium to treat the lock requests on the same target file by a client device through different intermediate proxy servers as different lock requests and not merge the lock requests. In the example embodiment of FIG. 2, client_1 may request to lock a portion of a file_1 on a storage server_1 through an intermediate proxy server_1. Further the client_1 may request to lock another portion of the file_1 on the storage server_1 through an intermediate proxy server_2. In the example embodiment, the portions of the file that the client requests a lock on may be overlapping. In this embodiment, even though the lock request is made by the same client for the same file on the storage server, the storage server treats the request as separate lock requests as if they were from different clients since the lock requests were made through different intermediate proxy servers. In this embodiment, the lock identifier associate with the first lock may be of the form of <client_1, intermediate proxy server_1> and the lock identifier associated with the second lock may be of the form of <client_1, intermediate proxy server_2>. The distinction in the lock identifier may enable the storage server_1 to separate the lock requests. In the embodiment of FIG. 2, the lock identifier may enable the storage medium 104 to communicate the response message to the client device through an intermediate server from which the NLM_LOCK request was obtained.

An example embodiment of the unlocking mechanism is given with respect to embodiments of FIGS. 1 and FIGS. 2. In this embodiment, in operation $206_E$, the client device 108 initiates a NLM_UNLOCK request procedure call to unlock the target file in the storage medium 104. In some embodiments, the NLM_UNLOCK request may be received by the intermediate proxy server 102. In certain embodiments, upon receiving the NLM_UNLOCK request message, in operation $206_F$, the intermediate proxy server 102 may communicate the NLM_UNLOCK message to the storage medium 104. In a further embodiment, the intermediate proxy server 102 may maintain the client information and the storage medium 104 information in an intermediate proxy server table to monitor status of events.

In the embodiment of FIG. 2, the storage medium 104 may receive the NLM_UNLOCK request from the intermediate proxy server 102 and an operation 216 is initiated. In this embodiment, in operation 216, the storage medium 104 may perform an unlock operation on the locked file. In addition, in operation 216, the storage medium 104 may determine whether the unlocked lock was the last lock through the respective intermediate proxy server 102 on the storage medium 104. In some embodiments, when a lock is removed a LCK_GRANTED message may be generated in response to the NLM_UNLOCK request. In certain embodiments, if the lock was the last lock, then a remove message may be appended to the LCK_GRANTED message. In a further embodiment, all entries associated with the locking information from the client device 108 through the intermediate proxy server 102 in the storage device table may be removed. In the embodiment of FIG. 2, in operation $206_G$, the LCK_GRANTED message may be communicated to the intermediate proxy server 102. In this embodiment, in operation 218, the intermediate proxy server 102 may remove from the intermediate proxy server status monitor file an entry of the status information associated with the lock between the client device 108 and the storage medium 104 to which the client device 108 forwarded an NLM_UNLOCK message to unlock a target file. In at least some embodiments, the entry of the status information associated with the lock between the client device 108 and the storage medium 104 to which the client device 108 forwarded an NLM_UNLOCK message to unlock a target file may be removed based on the remove message in the LCK_GRANTED message received by the intermediate proxy server 102. In the embodiment of FIG. 2, in operation $206_H$, the LCK_GRANTED reply message is forwarded to the client device 108 in response to the LCK_UNLOCK issued by the client device 108.

Refer now to the embodiment of FIG. 3. The embodiment of FIG. 3 is a packet view of a NLM request message in the NFS federated namespace environment. The components as described in the embodiment of FIG. 1 are used herein in reference to FIG. 3 for explanatory purposes. In the embodiment of FIG. 3, the NLM request message may include two main sections namely a RPC section 302 and an NLM section 304. In this embodiment, the appended length 306 section may be appended by the intermediate proxy server 102 to include an information that enables a successful transmission of NLM protocol messages from client device 108 to the storage medium $104_{1-N}$.

In one or more embodiments, such as the embodiment of FIG. 3, the RPC section may include, but not limited to three main subsections namely: RPC_ID, port and/or version. In FIG. 3, the RPC_ID subsection may include information that enables identification of the specific remote procedure call (RPC). In the embodiment of FIG. 3, the port subsection may include port information on which the RPC may be communicated. In some embodiments, the version subsection may include version information of the RPC.

In the embodiment of FIG. 3, the NLM section 304 may include, but not limited to three main sections namely: a locker subsection, a lock subsection and/or a flag subsection. In some embodiments, the locker subsection includes information about the client device (e.g., IP address) and process ID. In certain embodiments, the process ID may provide information about the identification number of the process or application that requests the lock or access of the target file. In some embodiments, the lock subsection may provide information about the start of the portion of the target file that is to be locked, offset, and type of lock being applied (e.g., exclusive lock, shared lock). In example embodiments of FIG. 3, the flag information may provide, but not limited to information on the type of RPC call. In some embodiments, the RPC procedure calls may have different procedure numbers. In certain embodiments, the RPC procedure call number may identify if a call is an asynchronous RPC call or a synchronous RPC call. In one or more embodiments the flag subsection may include, but may not be limited to the block flag and/or a reclaim flag. In some embodiments, the reclaim flag may provide arguments for reclamation when there is a restart on the intermediate proxy server 102 and/or the storage mediums $104_{1-N}$. In the embodiment of FIG. 3, the NLM section may be edited by a client device based on the file locking requirements. In this embodiment, the arguments may be input by the client device to specify a type of lock being applied, section of file to be locked, the client device information, waiting information and reclaiming information.

In the embodiment of FIG. 3, the appended length section 306 includes information about the intermediate proxy server (e.g., port details) and the forwarding context. In one or more embodiments, the forwarding context information includes the context_ID that provides information about the client device. In additional embodiments, the intermediate proxy server information may include a lock identifier. In the embodiment of FIG. 3, the appended length 306 section may be generated and appended to the lock request message by the intermediate proxy server 102.

Now refer to the embodiments of FIG. 1 and FIG. 4. The embodiment of FIG. 4 illustrates a remote procedure call diagram of a crash recovery handling operation when a client device reboots. In this embodiment, each of the devices in the data storage network is configured to maintain a status monitor file. The components as described in the embodiment of FIG. 1 are used herein in reference to FIG. 4 for explanatory purposes. In the embodiment of FIG. 4, the client device status monitor file of the client device 108 may be configured to include information on the intermediate proxy server 102 through which the target file on the storage medium 104 is locked and/or status of the locking request is communicated. In this embodiment, the information on the intermediate proxy server 102 through which the target file on the storage medium 104 is locked may be an IP (Internet protocol) address of the intermediate proxy server 102 and/or a fully qualified domain name (FQDN). In other embodiments, the status monitor file may include other transmission and locking related information related to the intermediate proxy server 102. In FIG. 4, the information in the client device status monitor may include, but not limited to the information on the intermediate proxy server 102. In the embodiment of FIG. 4, when there is client device reboot 402 (e.g., recovery from a crash, client device failure, client device restarts etc.), an operation $406_A$ is initiated. In operation $406_A$, a client status notify message (e.g., SM_NOTIFY) may be generated in the client device 108 and communicated to the intermediate proxy server 102 to which the client device 108 is coupled to. In this embodiment, in operation $406_A$ the client status notify message is transmitted to all the intermediate proxy servers through which the client locks files on various storage mediums. In some embodiments, the SM_NOTIFY message may be an RPC protocol that notifies that the client device 108 recovered from a crash and now is in an active state. In FIG. 4, the intermediate proxy server 102 on reception of the SM_NOTIFY message initiates an operation 404. In operation 404, the intermediate proxy server 102 initiates a forwarding operation of forwarding the SM_NOTIFY message to all the storage mediums on which the client holds a lock through the respective intermediate proxy server 102. In the example embodiment of FIG. 4, in the operation $406_B$, the SM_NOTIFY message may be forwarded to the storage mediums $104_1$ and $104_2$ on which the client device 108 maintains a lock. The SM_NOTIFY message of FIG. 4 sent to storage medium $104_1$ and storage medium $104_2$ may include information relevant to unlocking the files on the storage medium $104_1$ and storage medium $104_2$ that are locked by the client 108 that restarted. In reference to the embodiment of FIG. 4, the information about the client device 108, the storage mediums $104_{1-N}$ to which the lock request was communicated and the storage mediums $104_{1-N}$ on which lock was applied may be obtained from the intermediate proxy server status monitor file of the intermediate proxy server 102.

In the embodiment of FIG. 4, upon receiving the client device status notify message, the storage mediums, such as those of FIG. 1 $104_{1-2}$, may communicate a response message through an operation $406_C$ (e.g., acknowledgement message, STAT_SUCC) to the intermediate proxy server 102. In this embodiments, upon receiving the client device status notify message, an operation 408 may be initiated in the storage medium $104_{1-2}$. In operation 408, the storage mediums $104_{1-2}$ that receive the client device status notify message may remove all locks held by the client device 108 that issues the client device status notify message. In some embodiments, the storage medium may unlock the target files on which the client device that issued the client status notify message holds a lock. In certain embodiments, the storage medium may remove the respective client device 108 and the intermediate proxy server 102 pair from the storage medium status monitor file. In one or more embodiments, the storage medium may stop monitoring the lock status of the client device and storage medium pair. In the embodiment of FIG. 4, upon receiving a response message from the storage mediums $104_{1-2}$, the intermediate proxy server 102 may communicate a response message through an operation $406_D$ (e.g., acknowledgement message, STAT_SUCC) to the client device 108. The response messages may acknowledge to the sender that the recipient received the status notify message (e.g., SM_NOTIFY).

Refer now to the embodiments of FIG. 1 and FIG. 5. The embodiment of FIG. 5 illustrates a remote procedure call diagram of a crash recovery handling operation when the storage medium restarts. The components as described in the embodiment of FIG. 1 are used herein in reference to FIG. 5 for explanatory purposes.

In this embodiment, similar to the client device status monitor file of the client device 108, the storage mediums $104_{1-N}$ are also configured to maintain a storage medium status monitor file. In some embodiments, the storage medium status monitor file in the storage medium may be used for handling a crash recovery operation when the storage medium $104_1$ restarts. In certain embodiments, the storage medium status monitor file may include information about a pair of the client device 108 and the intermediate proxy server 102 through which the client device 108 locks the target file on the storage medium 104. In further embodiments, the storage medium status monitor file may be used for monitoring the lock status of a pair of the client device 108 and the intermediate proxy server 102 through which the client device 108 applies a lock on the target file on the storage medium $104_1$.

In the example embodiment of FIG. 5, when there is the storage medium $104_1$ reboot (e.g., recovery from a crash, storage medium failure, storage medium restarts etc.), an operation $506_A$ is initiated. In this embodiment, in operation $506_A$, a storage medium status notify message (e.g., SM_NOTIFY) message is generated in the storage medium $104_1$ and communicated to the intermediate proxy server 102 through which the client device 108 locked a file on the storage medium $104_1$. In one or more embodiments, the storage medium $104_1$ may use the storage medium status monitor file to identify all the intermediate proxy servers and the client devices that have applied a lock or requested for application of lock on files in the storage devices through the intermediate proxy server.

In one or more embodiments, the SM_NOTIFY message may be a RPC protocol that notifies that the intermediate proxy server 102 that the storage medium $104_1$ has recovered from a crash and now is in an active state. In the embodiment of FIG. 5, the intermediate proxy server 102 on reception of the SM_NOTIFY message may initiate an operation 504. In operation 504 of FIG. 5, the intermediate proxy server 102 uses the intermediate proxy server status monitor file of the intermediate proxy server 102 to determine the client devices that may be affected (e.g., impacted client device) by the storage medium $104_1$ reboot. In one or more embodiments, the impacted client devices are the client devices which hold locks on target files on the rebooted storage medium through the intermediate proxy server 102. In the embodiment of FIG. 5, the impacted storage mediums for the impacted client device 108 may be the storage mediums that granted locks to the impacted client device 108 through the intermediate proxy server 102. In FIG. 5, the impacted client may be the client device 108 and the impacted storage mediums of the impacted client 108 may be storage medium $104_2$.

In the embodiment of FIG. 5, in operation 504, the intermediate proxy server 102 may generate a status monitor message SM_NOTIFY by simulating reboot event to notify the impacted storage mediums $104_2$ of the impacted client that the intermediate proxy server 102 has just recovered from the crash and is in an active state, since the intermediate proxy server 102 may act as a proxy for the storage mediums $104_{1-N}$ forming the network attached storage data sharing cluster. In other embodiments, in operation 504, the intermediate proxy server 102 may generate another SM_NOTIFY to notify the client device 108 that the storage medium $104_1$ has recovered from the crash and the locks may be reclaimed from the respective storage mediums by the client device 108. In FIG. 5, in operation $506_B$, the SM_NOTIFY message generated for the impacted storage medium $104_2$ of the impacted client may be communicated to the impacted storage medium $104_2$ of the impacted client.

In the embodiment of FIG. 5, in operation 506, the SM_NOTIFY message generated for the impacted client device 108 may be forwarded to the impacted client device 108 that maintains lock on the target file in the storage medium $104_1$ through the intermediate proxy servers 102 through which the client device 108 is granted the lock on the target file on the storage medium. In some embodiments, the client device 108 upon reception of the SM_NOTIFY message initiates a reclamation lock operation by generating NLM_LOCK reclamation request. As the network attached storage data sharing cluster may not visible to the client device 108, upon receiving the SM_NOTIFY message from the intermediate proxy server 102, the client device 108 may forward a lock reclamation message for reclaiming locks on all the storage mediums through the intermediate proxy server 102, in the embodiment of FIG. 5. In one or more embodiments, the lock reclamation message may be a NLM_LOCK message in which the reclaim flag is set as true. In the embodiment of FIG. 5, in operation $506_D$, the NLM_LOCK reclamation message may be communicated to the storage medium $104_1$. In this embodiment, the intermediate proxy server 102 may forwards the NLM_LOCK reclamation message to the storage medium $104_1$ which restarted and/or holds the target file that the client device 108 held a lock on, when the intermediate proxy server 102 receives the NLM_LOCK reclamation message. In some embodiments, the storage medium $104_1$ to which the reclamation message may be forwarded by the intermediate proxy server 102 is determined by the intermediate proxy server 102. In certain embodiments, the intermediate proxy server 102 through a file handle may determine the storage medium $104_1$ to which the reclamation message is to be forwarded to. In further embodiments, the reclamation message may also be forwarded to the impacted storage medium $104_2$ of the impacted client device 108 as illustrated in example embodiment of FIG. 5. In operation $506_E$, the storage mediums $104_1$ upon reception of the NLM_LOCK reclamation message, confirms and grants the lock in FIG. 5. In operation $506_E$ of the embodiment of FIG. 5, the storage medium $104_1$ may generate a LCK_GRANTED message and communicates the LCK_GRANTED message to the client device 108 through the intermediate proxy server 102. In this embodiment, in operation $506_G$, the intermediate proxy server may communicate the LCK_GRANTED message to the client device 108. In this embodiment, operation $506_{H-K}$ may be similar to operations $506_{D-G}$, except that the operations $506_{H-K}$ function between client device 108 and storage medium $104_2$ through the intermediate proxy server 102.

Even though the impacted storage medium $104_2$ of the impacted client 108 may not reboot, the SM_NOTIFY message forwarded to the impacted storage medium $104_2$ of the impacted client 108 may avoid any conflict of lock status when the client device 108 sends a lock reclaim message to the impacted storage medium $104_2$ of the impacted client 108.

Refer now to the embodiments of FIG. 1 and FIG. 6. The embodiment of FIG. 6 illustrates a remote procedure call diagram of a crash recovery handling operation when the intermediate proxy server restarts. The components as described in the embodiment of FIG. 1 are used herein in reference to FIG. 6 for explanatory purposes. In this embodiment, the intermediate proxy server 102 is configured to maintain an intermediate proxy server status monitor file to handle the crash recovery operation when the intermediate proxy server 102 restarts. In this embodiment, the intermediate proxy server status monitor file may include a list of a pair of the storage medium $104_{1-N}$ and the client device 108 that maintains a lock on the target file in the storage medium $104_{1-N}$, through the intermediate proxy server 102.

In the embodiment of FIG. 6, when there is an intermediate proxy server reboots 602 (e.g., recovery from a crash, storage medium failure, etc.), an operation $606_A$ is initiated. In operation $606_A$, the intermediate proxy server 102 may obtain information about the client device that lock a target file on the storage medium through the intermediate proxy server 102 and the storage mediums that grant a lock to the client device through the intermediate proxy server 102. In additional embodiments, in operation $606_A$, the intermediate proxy server 102 may generate a SM_NOTIFY message to inform the storage medium $104_{1-N}$ that the intermediate proxy server 102 represents the client device 108. In one or more embodiments, the generated SM_NOTIFY message may be communicated by the rebooted intermediate proxy server 102 to all the storage mediums that grant a lock to client devices through the rebooted intermediate proxy server 102. In the example embodiment illustrated in FIG. 6 the rebooted intermediate proxy server may be represented as intermediate proxy server 102. In this embodiment, the intermediate proxy server 102 may generate an SM_NOTIFY message to communicate to all the client devices that lock a file on different storage mediums through the intermediate proxy server 102 to notify that the intermediate proxy server 102 is in an active state after a reboot. In some embodiments, the rebooted intermediate proxy server 102 may not transmit a SM_NOTIFY message to the client devices and storage mediums that do not initiate any communication through the rebooted intermediate proxy server 102. In certain embodiments, the SM_NO- TIFY message to the client device 108 would render the client device 108 to reclaim the lock in the storage device.

In the embodiment of FIG. 6, upon reception of the SM_NOTIFY message, the client device 108 generates a NLM_LOCK message to reclaim the lock on the file in the storage medium $104_1$. In this embodiment, in operation $606_C$, the NLM_LOCK reclamation message may be communicated to the storage medium $104_1$. The NLM_LOCK reclamation message reaches the storage medium $104_1$ through the intermediate proxy server 102. In this embodiment, the intermediate proxy server 102 on reception of the NLM_LOCK reclamation message, may forward the NLM_LOCK reclamation message to the storage medium $104_1$, in operation $606_D$. In one or more embodiments, upon receiving the NLM_LOCK reclamation message from the intermediate proxy server 102 for the client device 108, the storage mediums $104_1$ may handle the reclaim message as a new lock request. In some embodiments, whenever a storage medium receives a SM_NOTIFY it may release a lock on a file and treat an NLM_LOCK reclamation message as a new lock request. In certain embodiments, the storage medium may grant a lock on the file. In the embodiment of FIG. 6, in operation $606_E$, the storage medium $104_1$ may generate a LCK_GRANTED message and communicates the LCK_GRANTED message to the client device 108 through the intermediate proxy server 102. In this embodiment, in operation $506_F$, the intermediate proxy server may communicate the LCK_GRANTED message to the client device 108.

The embodiments described herein may be applied to handle crashes in which both storage mediums and client device, both storage mediums and intermediate proxy server, and both intermediate proxy server and the client device reboots simultaneously or substantially at the same time.

Refer now to the embodiment of FIG. 7. The embodiment of FIG. 7 illustrates a system view of a relocation of a file set from a source storage medium to a destination storage medium in the network file system federated namespace environment. The components as described in the embodiment of FIG. 1 are used herein in reference to FIG. 3 for explanatory purposes. In this embodiment, the client device 108 may include one or more applications that can access and/or apply locks on one or more files in one or more storage mediums $104_{1-N}$ through the intermediate proxy server 102. In some embodiments, the client device 108 may be a data processing system. In certain embodiments, the client device 108 in the data storage network may be NFS client device configured to perform operations on one or more files in one or more storage mediums $104_{1-N}$. In the embodiment of FIG. 7, the client device 108 may access or apply lock on one or more files in one or more storage mediums $104_{1-N}$ of the data sharing cluster 112 based on NLM protocol. In one or more embodiments, the data sharing cluster 112 may be a collection two or more storage mediums configured as a NAS as illustrated in the embodiment of FIG. 8.

In some embodiments, there may be a requirement for file set relocation from one storage medium to another storage medium (e.g., due to an upgrade, optimization, etc.). In such relocation scenarios, in the embodiment of FIG. 7, a message queue to hold and save the incoming NLM messages directed to the source storage medium $104_S$ may be generated. In this embodiment, the incoming NLM messages may be directed and queued in the message queue. In additional embodiments, the NLM operations on the files of the storage mediums are paused. In the embodiment of FIG. 7, the status of locks on the files may be stored in a dump file. In this embodiment, the locks on the files may be removed. In the embodiment of FIG. 7, once the locks are removed, the file set $702_1$ may be relocated to a destination storage medium $104_D$. In this embodiment, the dump file may also be relocated to the destination storage medium $104_D$. In further embodiments, the locks are reapplied on the respective file. An example of the lock migration operation given in the embodiment of FIG. 9.

Refer now to the embodiments of FIG. 1, FIG. 7 and FIG. 8. The embodiment of FIG. 8 illustrates a network view of a mesh network coupling the storage mediums of the group of storage mediums on a network forming a data sharing cluster and/or the intermediate proxy servers. The components as described in the embodiment of FIG. 1 and/or FIG. 7 are used herein in reference to FIG. 8 for explanatory purposes. In the embodiment of FIG. 8, each of the storage medium of the group of storage mediums forming a network attached storage data sharing cluster may be communicatively coupled to each through a mesh network to transport messages between the storage mediums. In one or more embodiments, the mesh network may include the storage mediums $104_{1-N}$ and/or the intermediate proxy server 102. In some embodiments, there may be more that one intermediate proxy servers. In certain embodiments, the intermediate proxy servers may be coupled to each other and/or the storage mediums $104_{1-N}$ through a mesh network. In one or more embodiments, the storage mediums $104_{1-N}$ may be a group of storage mediums forming a network attached storage data sharing cluster. In the embodiment of FIG. 8, a lock protocol message may be forwarded from the intermediate proxy server to the storage medium through a dedicated network tunnel over a dedicated port number. The storage medium may listen for messages on the dedicated port number. In the example embodiment of FIG. 8, any messages received on the dedicated port at the storage medium may be distinguished as a message forwarded from an intermediate proxy server or another storage medium of the group of storage mediums forming the network attached storage data sharing cluster. In some embodiments, the port number may be associated with the dedicated network tunnel.

Refer now to the embodiments of FIG. 1, FIG. 7 and FIG. 9. The embodiment of FIG. 9 illustrates a remote procedure call diagram of a lock migration operation in a network file system federated namespace environment. The components as described in the embodiment of FIG. 1 and/or FIG. 7 are used herein in reference to FIG. 9 for explanatory purposes.

In the embodiment of FIG. 9, to perform a file set $702_1$ relocation and lock migration operation while maintaining an existing lock status associated with the target file, the NLM requests on the target file of the source storage medium $104_S$ from the client device 108 may be paused, in operation 902 of FIG. 9. In this embodiment, while the NLM operations on the source storage medium $104_S$ are paused, all new incoming NLM/SM messages in operation $106_A$ and in operation $106_B$, may be queued into the message queue 914. In some embodiments, the queue may be maintained by the source storage medium $104_S$. In the embodiment of FIG. 9, in operation 904, one or more lock status associated with the one or more target file may be transferred from the source storage medium $104_S$ to a dump file 916 through a serialize function. In some embodiments, the serialize function may be a function that selects the locked files serially in the storage medium to determine and store the status of the lock on the file serially in the dump file.

In FIG. 9, in continuation of operation 902, the processing of the lock protocol message associated with the target file from the client device 108 may be resumed, after the one or more lock status associated with the one or more target files are copied from the source storage medium to the dump file 916. In this embodiment, in continuation of operation 904, a lock on the target file may be sequentially removed when each lock status associated with the target file is copied to the dump file 916. In further embodiments, in continuation of the operation 904, a storage medium status monitor file of the target file in the source storage medium may be deleted when all locks on the target file are removed (e.g., if multiple locks exist on the target file). In the embodiment of FIG. 9, in operation 906, a remove message may be transmitted from the source storage medium 104$_S$ to the intermediate proxy server 102 to delete a link identifier in the intermediate proxy server 102. In some embodiments, the link identifier may be embedded in the lock protocol message from the source storage medium to identify a pair of the source storage medium and the client device that maintains the lock on the target file in the source storage medium.

In the embodiment of FIG. 9, in operation 908, the dump file 916 may be transported to the destination storage medium 104$_D$ through a network file transport protocol. In some embodiments, the file set including the target files may be relocated from the source storage medium 104$_S$ to the destination storage medium 104$_D$ in the data sharing cluster over the network through a network file transfer protocol. In certain embodiments, an appropriate protocol such as File Transfer Protocol (FTP) or Hyper Text Transfer Protocol (HTTP) may be used for transportation of the file set from the source storage medium 104$_S$ to the destination storage medium 104$_D$.

In the embodiment of FIG. 9, in operation 910, one or more of the lock status associated with the target file may be transferred from the dump file 916 to the destination storage medium 104$_D$ through a de-serialize function. In this embodiment, complimentary to the serialize function, the de-serialize function may be a function that uses the dump file 916 to extract, build and apply the lock state on each of the file. In the embodiment of FIG. 9, in continuation to operation 910, a relocated target file on the destination storage medium 104$_D$ may be locked based on the lock status that is copied from the dump file to the destination storage medium 104$_D$. In this embodiment, in continuation to operation 910, a new status monitor file associated with each of the lock on the relocated target file may be created in the destination storage medium 104$_D$. In some embodiments, each of the lock on the relocated target file may be based on the lock status that is copied from the dump file 916 to the destination storage medium 104$_D$. In certain embodiments, a create message may be transmitted from the destination storage medium 104$_D$ to the intermediate proxy server 102 to store a link file in the intermediate proxy server 102. The link file from the destination storage medium may map the destination storage medium to the client device that maintains the lock on the target file in the destination storage medium 104$_D$ in the embodiment of FIG. 9.

In further embodiments, the lock protocol message of the client device 108 associated with a relocated target file may be transferred from the source storage medium 104$_S$ to the destination storage medium 104$_D$ through a referral message from the source storage medium 104$_S$, via the intermediate proxy server 102. In the embodiment of FIG. 9, the referral message may be issued by the source storage medium 104$_S$ to the intermediate proxy server 102, if the lock protocol message from the client device 108 requests to access the target file that is relocated to the destination storage medium 104$_D$.

Refer now to the embodiments of FIG. 1, FIG. 7 and FIG. 10. The embodiment of FIG. 10 illustrates a network view of a referral procedure of a lock migration operation in a network file system federated namespace environment. In this embodiment, in a lock migration operation in a network file system federated namespace a file set 702$_1$ may be relocated from the source storage medium 104$_S$ to the destination storage medium 104$_D$ illustrated as operation 708. In the example embodiment of FIG. 10, if the client device 108 and/or the intermediate proxy server 102 is unaware of the relocation of file set 702$_1$ to the destination storage medium 104$_D$, the intermediate proxy server 102 may continue to forward the NLM protocol messages related to the files in the file set 702$_1$ to the source storage medium 104$_S$, illustrated in FIG. 10 as operation 702.

In the embodiment of FIG. 10, the source storage medium 104$_S$ upon receiving a NLM protocol message related to the files in the file set 702$_1$ that have been relocated to the destination storage medium 104$_D$ may generate a referral message 1002. In this embodiment, the source storage medium 104$_S$ may forward the referral message to the intermediate proxy server 102 from which the source storage medium 104$_S$ received a request to access the relocated file set 702$_1$. In some embodiments, the referral message 1002 may be issued by the source storage medium to the intermediate proxy server 102, if a lock protocol message from a client device requests the source storage medium 104$_S$ to access a target file that is relocated to the destination storage medium. In certain embodiments, the referral message 1002 may include an information indicating the relocation or migration of the file set 702$_1$ from the source storage medium to the destination storage medium 104$_D$. In the embodiment of FIG. 10, the intermediate proxy server 102 may update an information on the intermediate proxy server 102 indicating the current location of the relocated file set 702$_1$ based on the referral message 1002. In this embodiment, upon receiving the referral message 1002 the intermediate proxy server 102 may initiate an operation 1004. In the operation 1004 the intermediate proxy server 102 may forward all the lock protocol messages related to the files in the file set 702$_1$ to the destination storage medium 104$_D$ based on the referral message 1002 as illustrated in the embodiment of FIG. 10.

Refer now to the embodiments of FIG. 1 and FIG. 11. The embodiment of FIG. 11 illustrates a system view of a data processing system in which any of the embodiments disclosed herein may be performed, according to one embodiment. The components as described in the embodiment of FIG. 1 are used herein in reference to FIG. 11 for explanatory purposes. Particularly, the system view 1150 of FIG. 11 illustrates a processor 1102, a main memory 1104, a static memory 1106, a bus 1108, a video display 1110, an alphanumeric input device 1112, a cursor control device 1114, a drive unit 1116, a signal generation device 1118, a network interface device 1120, a machine readable medium 1122, instructions 1124 and a network 1126, according to one embodiment. In the embodiment of FIG. 11, the data processing system discussed herein may be any of the devices such as the client device 108, the intermediate proxy server 102 and one or more storage mediums 104$_{1-N}$ which are discussed in aforementioned figures.

In the embodiment of FIG. 11, the system view 1150 may indicate a personal computer, a mobile device, a cell phone, a network enabled device and/or a data processing system in which one or more operations disclosed herein may be performed. In this embodiment, the processor 1102 may be a microprocessor, a state machine, an application-specific integrated circuit, a field programmable gate array, etc. In FIG. 11, the main memory 1104 may be a dynamic random access memory and/or a primary memory of a computer system. The static memory 1106 may be a hard drive, a flash drive, and/or other memory information associated with the data processing system, in the embodiment of FIG. 11.

In the embodiment of FIG. 11, the bus 1108 may be an interconnection between various circuits and/or structures of the data processing system. In this embodiment, the video display 1110 may provide graphical representation of information on the data processing system. In the embodiment of FIG. 11, the alpha-numeric input device 1112 may be a keypad, a keyboard and/or any other input device of text. The cursor control device 1114 may be a pointing device such as a mouse, in this embodiment.

In one or more embodiments, such as the embodiment of FIG. 11, the drive unit 1116 may be the hard drive, a storage system, and/or other longer term storage subsystem. In this embodiment, the signal generation device 1118 may be a bios and/or a functional operating system of the data processing system. In some embodiments, the network interface device 1120 may be a device that may perform interface functions such as code conversion, protocol conversion and/or buffering required for communication to and from a network 1126.

In the embodiment of FIG. 11, the machine readable medium 1122 may provide instructions on which any of the methods disclosed herein may be performed. In this embodiment, the instructions 1124 may provide source code and/or data code to the processor 1102 to enable any one or more operations disclosed herein.

Refer now to the embodiments of FIG. 1, FIG. 2 and FIG. 12. The embodiment of FIG. 12 illustrates a process flow diagram illustrating a locking mechanism. The components as described in the embodiment of FIG. 1 and/or FIG. 2 are used herein in reference to FIG. 12 for explanatory purposes. In the embodiment of FIG. 12, in operation 1202, a target file may be accessed in a storage medium (e.g., the storage medium $104_{1-N}$) over a network through the intermediate proxy server 102 using a processor. In some embodiments, the storage medium $104_{1-N}$ as discussed herein may be a storage server. In the embodiment of FIG. 12, in operation 1204, a lock protocol message (e.g., NLM_LOCK) may be transported between a client device (e.g., the client device 108) and the storage medium $104_{1-N}$ via the intermediate proxy server 102. In some embodiments, the lock protocol described herein may be a NLM lock protocol. In certain embodiments, the client device 108 may be any data processing system configured to utilize the storage device(s) $104_{1-N}$ in the network provided thereof.

In the embodiment of FIG. 12, the storage medium $104_{1-N}$ may be requested to lock the target file in the storage medium $104_{1-N}$ via the intermediate proxy server 102. In some embodiments, the lock identifier and/or 'a forwarding context' may be appended to a lock protocol message and/or transmitted from the intermediate proxy server 102 to the storage medium $104_{1-N}$. In certain embodiments, the lock protocol message as described is from the client device 108 to the storage device $104_{1-N}$. In other embodiments, the intermediate proxy server 102 may be configured to forward the lock protocol message from the client device 108 to the storage medium $104_{1-N}$, in certain embodiments.

In the embodiment of FIG. 12, a pair of a client device (e.g., the client device 108) and the intermediate proxy server 102 may be identified, via which the client device 108 locks the target file on the storage medium $104_{1-N}$ through a lock identifier. In this embodiment, a lock on the target file in the storage medium $104_{1-N}$ may be granted to the client device 108 through the intermediate proxy server 102. A record of the lock on the target file may be maintained in the storage medium $104_{1-N}$ that owns the target file.

In the embodiment of FIG. 12, in operation 1206, the target file in the storage medium is locked through a lock protocol using the processor to provide an access to the client device 108 and/or the intermediate proxy server 102 to modify the target file to at most one user at any given time, via the intermediate proxy server. In some embodiments, the lock protocol may be an NLM protocol. In some embodiments, the intermediate proxy server 102 may be selected through which the storage medium $104_{1-N}$ transmits the lock protocol message to the client device 108 based on the lock identifier. In certain embodiments, the forwarding context may be saved in the intermediate proxy server 102 to enable the intermediate proxy server 102 to identify the client device to which the lock protocol message from the storage medium is addressed through the forwarding context.

Refer now to the embodiments of FIG. 1, FIG. 7, FIG. 9 and FIG. 13A. The embodiment of FIG. 13A illustrates a process flow diagram illustrating a lock migration mechanism described herein. The components as described in the embodiment of FIG. 1, FIG. 7 and/or FIG. 9 are used herein in reference to FIG. 13A for explanatory purposes. In the embodiment of FIG. 13A, in operation 1302, a processing of a lock protocol message may be paused associated with the target file from a client device (e.g., the client device 108), through transferring the lock protocol message (NLM_LOCK) to a message queue (e.g., the message queue 914 of FIG. 9) maintained at the source storage medium (e.g., as illustrated in FIG. 9). In this embodiment, in operation 1304, one or more lock statuses associated with the target file may be transferred from the source storage medium (e.g., the storage medium $104_S$ in FIG. 9) to a dump file (e.g., the dump file 916 of FIG. 9) through a serialize function, while the processing of the lock protocol message is paused. In further embodiments, the processing of the lock protocol message associated with the target file may be reassumed from the client device 108, after the lock status associated with the target file copied from the source storage medium $104_S$ to the dump file 916. In some embodiments, in operation 1306, a storage medium status monitor file of the target file may be deleted in the source storage medium $104_S$ when all locks on the target file are removed, if multiple locks exist on the target file.

In some embodiments, in operation 1308, a link identifier in the intermediate proxy server 102 associated with the target file 916 may be deleted. In certain embodiments, a remove message (e.g., the map remove message 906) may be transmitted from the source storage medium $104_S$ to the intermediate proxy server 102 to delete a link identifier associated with the target file 916 in the intermediate proxy server 102. In some embodiments, the link identifier may be embedded in the lock protocol message from the source storage medium $104_S$ to identify a pair of the source storage medium $104_S$ and the client device 108 that maintains the lock on the target file in the source storage medium $104_S$.

In the embodiment of FIG. 13A, in operation 1310, the dump file 916 may be transported to the destination storage medium $104_D$ (e.g., as illustrated in the operation 908 of FIG. 9) through a network file transport protocol (e.g., FTP). In this embodiment, in operation 1312, the target file may be relocated from the source storage medium $104_S$ to the destination storage medium $104_D$ of the group of storage mediums forming the data sharing cluster (e.g., NAS data sharing cluster) over the network through a network file transfer protocol (e.g., FTP). In some embodiments, the lock protocol message of the client device 108 associated with a relocated target file may be forwarded, from the source storage medium $104_S$ to the destination storage medium $104_D$ through a referral message from the storage medium $104_S$, via the intermediate proxy server 102. In certain embodiments, the referral message may be issued by the source storage medium $104_S$ to the intermediate proxy server 102, if the lock protocol message from a client device 108 requests to access the target file that is relocated to the destination storage medium 104$_D$.

Refer now to the embodiments of FIG. 1, FIG. 7, FIG. 9, FIG. 13A and FIG. 13B. The embodiment of FIG. 13B illustrates a continuation of FIG. 13A illustrating operations involved after the transfer of the target file has been made. The components as described in the embodiment of FIG. 1, FIG. 7, FIG. 9 and/or FIG. 13A are used herein in reference to FIG. 13A for explanatory purposes. In the embodiment of FIG. 13B, in operation 1320, one or more lock statuses associated with the target file may be transferred from the dump file 916 to the destination storage medium 104$_D$ through a de-serialize function. In this embodiment, in operation 1322, a relocated target file on the destination storage medium 104$_D$ may be locked based on the lock status that may be copied from the dump file 916 to the destination storage medium 104$_D$. In this embodiment, in operation 1324, a new status monitor file may be created associated with each of the lock on the relocated target file in the destination storage medium 104$_D$. In some embodiments, each of the lock on the relocated target file may be based on the lock status that is copied from the dump file 916 to the destination storage medium 104$_D$. In the embodiment of FIG. 13B, in operation 1326, a create message (e.g., a map create message) may be transmitted from the destination storage medium 104$_D$ to the intermediate proxy server 102 to store a link file in the intermediate proxy server 102. The link file from the destination storage medium 104$_D$ may map the destination storage medium 104$_D$ to the client device 108 that maintains the lock on the target file in the destination storage medium 104$_D$.

Refer now to the embodiments of FIG. 1 and FIG. 14. The embodiment of FIG. 14 illustrates process flow diagram illustrating an operation of the intermediate proxy server. The components as described in the embodiment of FIG. 1 are used herein in reference to FIG. 14 for explanatory purposes. In the embodiment of FIG. 14, in operation 1402, one or more lock protocol messages and/or one or more status notify message may be forwarded from a client device 108 to one or more storage mediums 104$_{1-N}$ using a processor, and from the storage medium 104$_{1-N}$ to the client device 108 using the processor. In some embodiments, in operation 1404, the forwarding context including one or more of a client device address and client device port number may be created by the intermediate proxy server 102 to identify the client device to which the lock protocol message from the storage medium is addressed. In further embodiments, in operation 1406 a lock identifier and the forwarding context may be appended to the lock protocol message when forwarding the lock protocol message from the client device 108 to the storage medium 104$_{1-N}$. The lock identifier is used to identify a pair of the client device and the intermediate proxy server through which the lock protocol message from the client device is forwarded to the storage medium. In the embodiment of FIG. 14, in operation 1408, a forwarding context may be stored in the intermediate proxy server(s) 102. In this embodiment, in operation 1410, an intermediate proxy server status monitor file and/or the lock identifier may be maintained to improve a robustness of a locking operation of a target file through a crash recovery handling operation. In this embodiment, an intermediate proxy server status monitor file may be stored in the intermediate proxy server 102 to handle the crash recovery operation when the intermediate proxy server 102 restarts. In some embodiments, the intermediate proxy server status monitor file may include a list of a pair of the storage medium and the client device that maintains a lock on the target file in the storage medium, via the intermediate proxy server 102. In one or more embodiments, a storage medium status monitor file may be maintained in the storage medium 104$_{1-N}$ to handle a crash recovery operation when the storage medium 104$_{1-N}$ restarts. In some embodiments, the storage medium status monitor file may include information about a list of a pair of a client device 108 and the intermediate proxy server 102 via which the client device locks the target file on the storage medium 104$_{1-N}$.

In this embodiment, a client status notify message may be transmitted to all the storage medium(s) 104$_{1-N}$ on which a client device 108 maintains a lock on the target file in the storage medium 104$_{1-N}$ when the client device 108 restarts, via the intermediate proxy server 102 through which the client device 108 obtains the lock on the target file.

In some embodiments, an intermediate proxy server status notify message may be broadcasted to all the client device(s) 108 that lock the target file on the storage medium 104$_{1-N}$ through the intermediate proxy server 102 and all the storage medium(s) 104$_{1-N}$ that grant the lock on the target file through the intermediate proxy server 102 when the intermediate proxy server 102 restarts. In certain embodiments, a storage medium status notify message may be forwarded to each of the client device(s) 108 that maintain lock on the target file in the storage medium, via the respective intermediate proxy server(s) 102 through which the client device 108 grants the lock on the target file on the storage medium. In this embodiment, a list of the client device(s) that maintain a lock on the target file may be identified in the storage medium 104$_{1-N}$ and a list of impacted storage mediums of each of the client device that maintain the lock on the target file in an impacted storage medium.

In one or more embodiments, a client status notify message may be transmitted to all the impacted storage medium of each of the client device that maintain the lock on the target file in the impacted storage medium, via the intermediate proxy server. In some embodiments, a restart of the intermediate proxy server 102 to transmit may be simulated to transmit a status notify message to the list of the client device(s) 108 that maintain a lock on the target file in the storage medium 104$_{1-N}$ and the list of impacted storage mediums of each of the client device(s) that maintain the lock on the target file in the impacted storage medium.

In some embodiments, an intermediate proxy server status monitor file may be maintained to improve a robustness of a locking operation of a target file through a crash recovery handling operation. In this embodiment, the forwarding context including one or more of a client device address and client device port number may be created to identify the client device to which the lock protocol message from the storage medium is addressed.

In one or more embodiments, the lock identifier is used to identify a pair of the client device and the intermediate proxy server through which the lock protocol message from the client device is forwarded to the storage medium. In some embodiments, an asynchronous lock protocol message from the client device may be changed to a synchronous lock protocol message. In other embodiments, the asynchronous lock protocol message may be forwarded from the client device as the synchronous lock protocol message to the storage medium.

Refer now to the embodiments of FIG. 1, FIG. 6 and FIG. 15. The embodiment of FIG. 15 illustrates a process flow diagram illustrating crash recovery handling operation performed through the intermediate proxy server when the storage medium restarts. The components as described in the embodiment of FIG. 1 and/or FIG. 6 are used herein in reference to FIG. 15 for explanatory purposes. In one or more embodiments, a client status notify message (e.g., SM_NOTIFY as illustrated in FIG. 6) may be transmitted to all the storage medium(s) 104$_{1-N}$ on which the client device 108 maintains a lock on the target file in the storage medium (e.g., the storage medium 104$_{1-N}$) when the client device restarts, via the intermediate proxy server 102 through which the client device receives grant to lock the target file (e.g., as illustrated in FIG. 6).

In one or more embodiments, a proxy server status notify message may be broadcasted to all the client device(s) 108 that have locks on one or more target filed on one or more storage medium(s) 104$_{1-N}$ through the intermediate proxy server 102 and all the storage medium(s) 104$_{1-N}$ that grant a lock on the target file through the intermediate proxy server 102 when the intermediate proxy server 102 restarts. In the embodiment of FIG. 15, in operation 1502, a restart may be simulated, when the storage medium 104$_{1-N}$ restarts to transmit a status notify message to the list of the client device(s) 108 that maintain a lock on the target file in the storage medium 104$_{1-N}$ and the list of impacted storage mediums of each of the client device(s) 108 that maintain the lock on the target file in the impacted storage medium.

In this embodiment, in operation 1504, a storage medium status notify message may be forwarded to each of the client device(s) 108 that maintain lock on the target file in the storage medium 104$_{1-N}$, via the respective intermediate proxy server(s) 102 through which the client device 108 is granted the lock on the target file on the storage medium 104$_{1-N}$. In the embodiment of FIG. 15, in operation 1506, a list of the client device(s) 108 that maintain lock on the target file may be identified in the storage medium 104$_{1-N}$ and a list of an impacted storage medium of each of the client devices that maintain lock on the target file in the impacted storage medium. In some embodiments, in operation 1508, a client status notify message may be transmitted to all the impacted storage medium of each of the client device that maintain lock on the target file in the impacted storage medium, via the intermediate proxy server 102.

While one or more embodiments of the present invention have been described, it will be appreciated that those skilled in the art upon reading the specification and studying the drawings will realize various alterations, additions, permutations and equivalents thereof. It is therefore intended that embodiments of the present invention include all such alterations, additions, permutations, and equivalents as fall within the true spirit and scope of the invention as defined in the following claims. Thus, the scope of the invention should be defined by the claims, including the full scope of equivalents thereof.

What is claimed is:

1. A method comprising:
accessing a target file in a storage medium over a network through an intermediate proxy server using a processor, wherein the storage medium is any one storage medium of a group of storage mediums on the network forming a data sharing cluster, wherein the storage medium is a system configured to provide services to a set of client devices;
locking the target file in the storage medium through a lock protocol using the processor to provide an access to modify the target file to at most one user at any given time, via multiple intermediate proxy servers;
identifying a pair of a client device and the intermediate proxy server via which the client device locks the target file on the storage medium through a lock identifier, wherein communication between the client device and the storage medium is enabled by the intermediate proxy server, wherein the intermediate proxy server represents a set of storage mediums;
appending the lock identifier and a forwarding context to a lock protocol message transmitted from the intermediate proxy server to the storage medium, wherein the lock protocol message is from the client device, wherein the intermediate proxy server forwards the lock protocol message from the client device to the storage medium;
selecting the intermediate proxy server through which the storage medium transmits the lock protocol message to the client device based on the lock identifier;
saving the forwarding context in the intermediate proxy server, the intermediate proxy server to identify the client device to which the lock protocol message from the storage medium is addressed through the forwarding context, wherein the forwarding comprising at least one of a client device address and a client device port number;
transporting the lock protocol message between the client device and the storage medium via the intermediate proxy server; and coupling each of the storage medium of the group of storage mediums forming the data sharing cluster to one another through a mesh network to transport messages between the group of storage mediums.

2. The method of claim 1, further comprising:
distinguishing at the storage medium a lock protocol message forwarded via the intermediate proxy server through transmitting the lock protocol message from the intermediate proxy server to the storage medium over a dedicated network tunnel.

3. The method of claim 2:
wherein the storage medium listens for messages forwarded through the intermediate proxy server over a specific device port number, and
wherein the specific device port number is associated with the dedicated network tunnel.

4. The method of claim 1:
wherein the intermediate proxy server to be coupled in between a client device and the group of storage mediums on the network, wherein the client device, the intermediate proxy server and the storage medium are communicatively coupled via the network.

5. The method of claim 1:
wherein the lock protocol is an NLM lock protocol, and
wherein the data sharing cluster is a network attached storage data sharing cluster.

6. The method of claim 1, wherein the lock protocol message to comprise:
a lock request message to lock the target file in the storage medium, when the lock protocol message is from the client device; and
a lock granted message to grant the client device a lock on the target file in the storage medium, when the lock protocol message is from at least one of the storage medium and the intermediate proxy server.

7. The method of claim 1, further comprising:
requesting the storage medium to lock the target file in the storage medium via the intermediate proxy server;
maintaining a record of the lock on the target file in the storage medium that owns the target file; and
granting through the intermediate proxy server to a client device a lock on the target file in the storage medium.

8. The method of claim 1, further comprising:
relocating the target file between a source storage medium and a destination storage medium of the group of storage mediums while maintaining an existing lock status associated with the target file through a lock migration operation; and applying a crash recovery handling operation to improve a robustness of the locking operation.

9. The method of claim 8, wherein the crash recovery handling operation comprising:
  transmitting a client status notify message to all the storage medium on which a client device maintains a lock on the target file in the storage medium when the client device restarts; via the intermediate proxy server through which the client device obtains the lock on the target file; and
  broadcasting an intermediate proxy server status notify message to all the client device that lock the target file on the storage medium through the intermediate proxy server and all the storage medium that grant the lock on the target file through the intermediate proxy server when the intermediate proxy server restarts.

10. The method of claim 8, wherein when the storage medium restarts, the crash recovery handling operation to comprise:
  forwarding a storage medium status notify message to each of a client device that maintain lock on the target file in the storage medium; via the respective intermediate proxy servers through which the client device is granted the lock on the target file on the storage medium;
  identifying a list of the client device that maintain a lock on the target file in the storage medium and a list of impacted storage mediums of each of the client device that maintain the lock on the target file in an impacted storage medium;
  transmitting a client status notify message to all the impacted storage medium of each of the client device that maintain the lock on the target file in the impacted storage medium; via the intermediate proxy server; and
  simulating a restart of the intermediate proxy server to transmit a status notify message to the list of the client device that maintain a lock on the target file in the storage medium and the list of impacted storage mediums of each of the client device that maintain the lock on the target file in the impacted storage medium.

11. The method of claim 8, wherein the lock migration operation comprising:
  pausing a processing of a lock protocol message associated with the target file from a client device, through transferring the lock protocol message to a message queue maintained at the source storage medium;
  transferring a plurality of lock status associated with the target file from the source storage medium to a dump file through a serialize function, while the processing of the lock protocol message is paused; and
  resuming the processing of the lock protocol message associated with the target file from the client device, after the plurality of lock status associated with the target file is copied from the source storage medium to the dump file.

12. The method of claim 11, wherein the lock migration operation further comprising:
  sequentially removing a lock on the target file when each lock status associated with the target file is copied to the dump file;
  deleting a storage medium status monitor file of the target file in the source storage medium when all locks on the target file are removed, if multiple locks exist on the target file;
  transmitting a remove message from the source storage medium to the intermediate proxy server to delete a link identifier in the intermediate proxy server, wherein the link identifier embedded in the lock protocol message from the source storage medium to identify a pair of the source storage medium and the client device that maintains the lock on the target file in the source storage medium;
  transporting the dump file to the destination storage medium through a network file transport protocol; and
  relocating the target file from the source storage medium to the destination storage medium of the group of storage mediums forming the data sharing cluster over the network through a network file transfer protocol.

13. The method of claim 12, wherein after relocating the target file to the destination storage medium, the lock migration operation to further comprise:
  transferring a plurality of the lock status associated with the target file from the dump file to the destination storage medium through a de-serialize function;
  locking a relocated target file on the destination storage medium based on the lock status that is copied from the dump file to the destination storage medium;
  creating a new status monitor file associated with each of the lock on the relocated target file in the destination storage medium, wherein each of the lock on the relocated target file is based on the lock status that is copied from the dump file to the destination storage medium; and
  transmitting a create message from the destination storage medium to the intermediate proxy server to store a link file in the intermediate proxy server, wherein the link file from the destination storage medium to map the destination storage medium to the client device that maintains the lock on the target file in the destination storage medium.

14. The method of claim 11:
  wherein the lock migration operation further comprising:
    forwarding the lock protocol message of the client device associated with a relocated target file, from the source storage medium to the destination storage medium through a referral message from the storage medium, via the intermediate proxy server, and
  wherein the referral message is issued by the source storage medium to the intermediate proxy server, if the lock protocol message from a client device requests to access the target file that is relocated to the destination storage medium.

15. The method of claim 8, wherein the crash recovery handling operation comprising:
  maintaining a storage medium status monitor file in the storage medium to handle a crash recovery operation when the storage medium restarts, wherein the storage medium status monitor file comprises a list of a pair of a client device and the intermediate proxy server via which the client device locks the target file on the storage medium; and
  storing an intermediate proxy server status monitor file in the intermediate proxy server to handle the crash recovery operation when the intermediate proxy server restarts, wherein the intermediate proxy server status monitor file comprises a list of a pair of the storage medium and the client device that maintains a lock on the target file in the storage medium, via the intermediate proxy server.

16. The method of claim 15
  wherein the storage medium status monitor file to monitor a lock status of a pair of client device and the intermediate proxy server via which the client device locks the target file on the storage medium, and wherein the intermediate proxy server status monitor file to monitor the lock status of the pair of the storage medium and the client device that maintains the lock on the target file in the storage medium, via the intermediate proxy server.

17. A method of an intermediate proxy server comprising:
forwarding at least one of a lock protocol message and a status notify message from a client device to a storage medium using a processor, and from the storage medium to the client device using the processor, wherein the storage medium is a system configured to provide services to a set of client devices;
storing a forwarding context in the intermediate proxy server;
maintaining an intermediate proxy server status monitor file to improve a robustness of a locking operation of a target file through a crash recovery handling operation;
creating the forwarding context comprising at least one of a client device address and client device port number to identify the client device to which the lock protocol message from the storage medium is addressed;
appending a lock identifier and the forwarding context to the lock protocol message when forwarding the lock protocol message from the client device to the storage medium; wherein the lock identifier to identify a pair of the client device and the intermediate proxy server through which the lock protocol message from the client device is forwarded to the storage medium, wherein communication between the client device and the storage medium is enabled by the intermediate proxy server, wherein the intermediate proxy server represents a set of storage mediums;
changing an asynchronous lock protocol message from the client device to a synchronous lock protocol message; and
forwarding the asynchronous lock protocol message from the client device as the synchronous lock protocol message to the storage medium.

18. The method of the intermediate proxy server of claim 17, wherein:
a link identifier is embedded in the lock protocol message from a source storage medium, the link identifier to map the storage medium to the client device that maintains a lock on the target file in the source storage medium.

19. The method of the intermediate proxy server of claim 17:
wherein the crash recovery handling operation comprising:
transmitting a client status notify message to all the storage medium on which the client device maintains a lock on the target file in the storage medium when the client device restarts; via the intermediate proxy server through which the client device receives grant to lock the target file;
broadcasting a proxy server status notify message to all the client device that lock the target file on the storage medium through the intermediate proxy server and all the storage medium that grant a lock on the target file through the intermediate proxy server when the intermediate proxy server restarts; and
simulating a restart, when the storage medium restarts to transmit a status notify message to the list of the client device that maintain a lock on the target file in the storage medium and the list of impacted storage mediums of each of the client device that maintain the lock on the target file in the impacted storage medium.

20. The method of the intermediate proxy server of claim 17:
wherein the crash recovery handling operation further comprising:
forwarding a storage medium status notify message to each of the client device that maintain lock on the target file in the storage medium; via the respective intermediate proxy servers through which the client device is granted the lock on the target file on the storage medium;
identifying a list of the client device that maintain lock on the target file in the storage medium and a list of an impacted storage medium of each of the client device that maintain lock on the target file in the impacted storage medium; and
transmitting a client status notify message to all the impacted storage medium of each of the client device that maintain lock on the target file in the impacted storage medium; via the intermediate proxy server.

21. A comprising:
a client device;
a plurality of storage mediums forming a data sharing cluster, a storage medium of the plurality of storage mediums to comprise a target file, wherein a storage medium of the plurality of storage mediums is a system configured to provide services to a set of client devices; and
an intermediate proxy server coupled between the client device and the storage medium over a network through a transmission medium, wherein communication between the client device and the storage medium is enabled by the intermediate proxy server, wherein the intermediate proxy server represents a set of storage mediums; the intermediate proxy server being configured to:
forward at least one of a lock protocol message and a status notify message from the client device to the storage medium, and from the storage medium to the client device,
create a forwarding context comprising at least one of a client device address, client device port number to identify the client device to which the lock protocol message from the storage medium is addressed,
append a lock identifier and the forwarding context to the lock protocol message when forwarding the lock protocol message from the client device to the storage medium, wherein the lock identifier to identify a pair of the client device and the intermediate proxy server through which the lock protocol message from the client device is forwarded to the storage medium,
store the forwarding context in the intermediate proxy server, and
maintain a link identifier to improve a robustness of a locking operation of the target file through a crash recovery handling operation; the plurality of storage mediums being configured to:
maintain a record of a lock on the target file granted to the client device in the storage medium that owns the target file;
grant through the intermediate proxy server to the client device the lock on the target file in the storage medium;
relocate the target file between a source storage medium and a destination storage medium of a group of storage mediums while maintaining an existing lock status associated with the target file through a lock migration operation; and
pair the client device and the intermediate proxy server via which the client device locks the target file on the storage medium, the said client device and the intermediate proxy server pair is identified through the lock identifier.

22. The system of claim 21, further comprising:

the client device configured to:
- request the storage medium to lock the target file in the storage medium via the intermediate proxy server;
- access the target file in the storage medium over the network through the intermediate proxy server, wherein the storage medium is any one storage medium of a group of storage mediums on the network forming the data sharing cluster; and
- lock the target file in the storage medium through an NLM lock protocol to enable an access to modify the target file to at most one user at any given time, via the intermediate proxy server.

\* \* \* \* \*